(12) United States Patent
Gilbert et al.

(10) Patent No.: US 10,523,981 B2
(45) Date of Patent: *Dec. 31, 2019

(54) MULTI-WINDOW VIDEO NAVIGATION SYSTEM BASED ON CONTENT—AWARE INFORMATIVE DISPLAY

(71) Applicants: Jeffrey Gilbert, Highland Park, IL (US); Robert Miller, Evanston, IL (US); Joseph Inzerillo, Brooklyn, NY (US); Khurram Siddiqui, San Jose, CA (US)

(72) Inventors: Jeffrey Gilbert, Highland Park, IL (US); Robert Miller, Evanston, IL (US); Joseph Inzerillo, Brooklyn, NY (US); Khurram Siddiqui, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,659

(22) Filed: Sep. 7, 2018

(65) Prior Publication Data
US 2019/0068998 A1 Feb. 28, 2019

Related U.S. Application Data

(63) Continuation of application No. 11/091,083, filed on Mar. 28, 2005, now Pat. No. 10,110,937.

(51) Int. Cl.
| | |
|---|---|
| *H04N 21/422* | (2011.01) |
| *H04N 21/2347* | (2011.01) |
| *H04L 29/06* | (2006.01) |
| *H04N 5/445* | (2011.01) |
| *H04N 7/167* | (2011.01) |

(Continued)

(52) U.S. Cl.
CPC ... *H04N 21/2347* (2013.01); *H04L 29/06027* (2013.01); *H04N 5/44543* (2013.01); *H04N 5/44591* (2013.01); *H04N 7/1675* (2013.01); *H04N 7/17318* (2013.01); *H04N 21/2143* (2013.01); *H04N 21/4131* (2013.01); *H04N 21/43615* (2013.01); *H04N 21/43632* (2013.01); *H04N 21/4405* (2013.01); *H04N 21/4408* (2013.01); *H04N 21/440263* (2013.01); *H04N 21/4788* (2013.01); *H04N 21/4821* (2013.01); *H04N 21/42209* (2013.01)

(58) Field of Classification Search
CPC .............................................. H04N 21/42209
See application file for complete search history.

(56) References Cited

U.S. PATENT DOCUMENTS

| | | | | |
|---|---|---|---|---|
| 5,621,456 A | * | 4/1997 | Florin | H04N 5/4403 348/E5.103 |
| 7,373,650 B1 | * | 5/2008 | Rodriguez | H04N 5/44591 348/565 |

(Continued)

*Primary Examiner* — Michael H Hong

(57) ABSTRACT

A telecommunications network for a high-rise Multi-Dwelling Unit (MDU) is provided. In the telecommunications network eliminates much of the wiring and space required for voice, video and data services, electrical closets, security cameras, building automation, fire annunciation systems, hard-wired smoke detectors, hard-wired heat detectors, electrical meters through the use of an integrated Ethernet communication system. Additionally, a video program guide (VPG) is provided that allows a user to interact with multiple streams of video in real time. The VPG includes techniques for displaying multiple streams of data on a single screen for a user.

15 Claims, 20 Drawing Sheets

(51) Int. Cl.
*H04N 7/173* (2011.01)
*H04N 21/214* (2011.01)
*H04N 21/41* (2011.01)
*H04N 21/436* (2011.01)
*H04N 21/4363* (2011.01)
*H04N 21/4402* (2011.01)
*H04N 21/4405* (2011.01)
*H04N 21/4408* (2011.01)
*H04N 21/4788* (2011.01)
*H04N 21/482* (2011.01)

(56) References Cited

U.S. PATENT DOCUMENTS

| | | | | |
|---|---|---|---|---|
| 7,757,252 B1 * | 7/2010 | Agasse | ............... | H04N 5/44543 |
| | | | | 725/41 |
| 7,873,972 B2 * | 1/2011 | Zaslavsky | .......... | H04N 21/4316 |
| | | | | 348/333.05 |
| 2002/0166123 A1 * | 11/2002 | Schrader | ............. | G11B 27/105 |
| | | | | 725/58 |
| 2003/0163832 A1 * | 8/2003 | Tsuria | ....................... | H04N 5/76 |
| | | | | 725/135 |

* cited by examiner

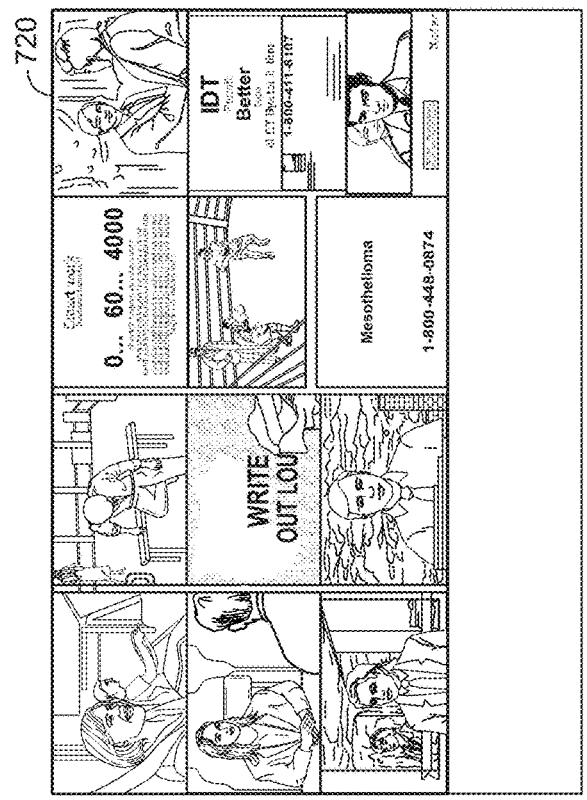
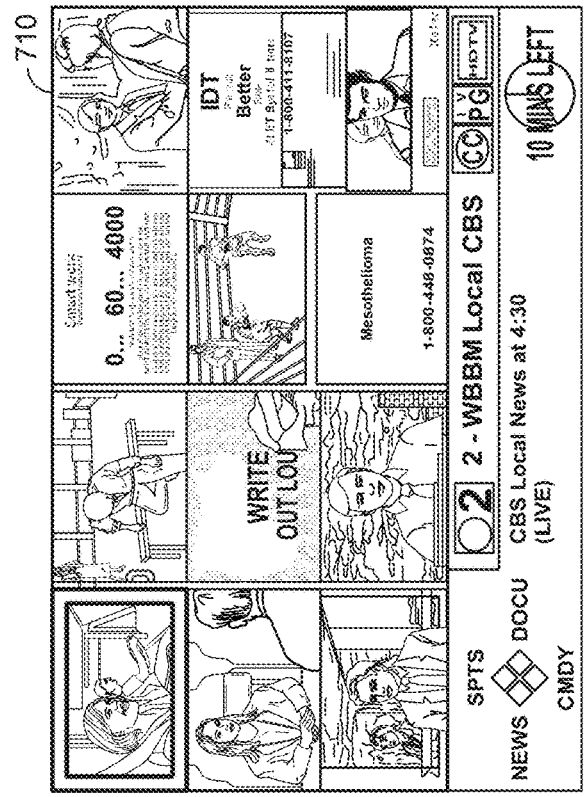
FIGURE 7

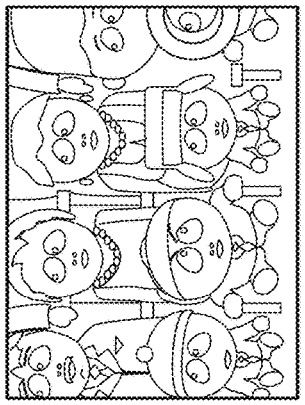
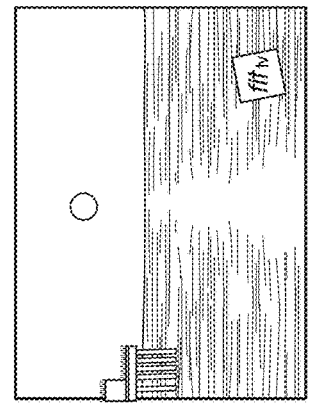
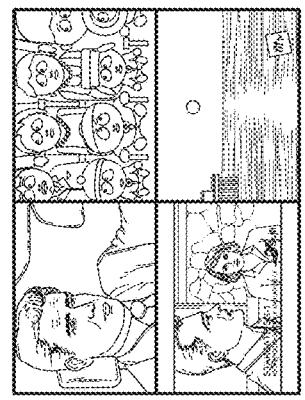
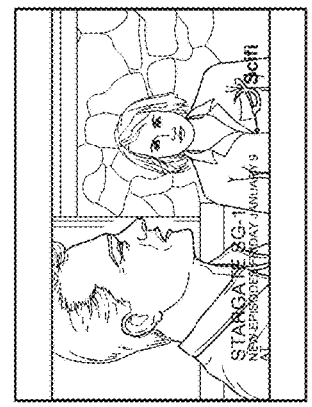
FIGURE 8

MULTI-WINDOW VIDEO NAVIGATION SYSTEM BASED ON CONTENT—AWARE INFORMATIVE DISPLAY

CROSS-REFERENCE TO RELATED APPLICATIONS

This application is a continuation of application Ser. No. 11/091,083 and claims the benefit of U.S. Provisional Application No. 60/556,854, filed Mar. 26, 2004.

BACKGROUND OF THE INVENTION

The present invention generally relates to an advanced consumer telecommunications network for implementation in a Multi-Dwelling Unit (MDU). More particularly, the present invention relates to retrofitting or installing specialized telecommunications resources in a MDU and providing methodologies for users to interact with programming, such as video, delivered over the telecommunications network in the MDU.

Since the first days of television, television channels have been assigned numerals. To navigate among channels, the user typically had to either turn a knob or press a button or set of buttons. Where numerical buttons exist, the user may press the appropriate button(s) to navigate directly to the channel of his choice, provided he knows it. Alternatively, a user may move up and down the sequence of numbers in order until arriving at a channel of interest.

More recently, cable and satellite television systems have facilitated navigation among channels by providing a textual list of channels, program names, descriptions, and airtimes in a spreadsheet-like format. Users are allowed to scroll through the list until finding a channel of interest and then command the system to tune to that channel with the press of a button. Very recently, individual movies or other programs have been made available in addition to the traditional sequential channels. Navigation through those items is similar, although program or movie names are generally substituted for channel names and numbers.

For simplicity, the term "channel" as used in this document will refer to video and/or audio channels as well as video and/or audio programs that may or may not be part of a traditionally sequenced channel.

Glossary of Terms

Video—A series of motion images displayed in succession to create the appearance of real life. Video is transmitted in a Format that defines the amount of visual information conveyed in a given time interval. Common rate of frame or "frame rates" include but are not limited to 15, 24, 29.97 and 30 frames per second.

Format—The standard by which video is transmitted. Formats generally are divided into two groups, digital and analog. Digital Formats generally define the horizontal and vertical sizes of the images (in the form of individual dots or Pixels), the frame rate, the Color Space, transmission mechanism, encoding/digitizing mechanism, and Compression standards. Examples of this standard would be ATSC, MPEG4, MPEG2, MPEG1, etc. Analog Formats generally define the amount of frequency space or bandwidth dedicated to a given video channel, a method of modulating the analog signal on some type of carrier, a method of timing the screen refreshes and a color encoding method. Both Formats also contain audio information in a similar way.

Color Space—The amount of information capacity reserved for color information for a given pixel as well as the constituent colors used to define the gamut of color possible. For example red, green and blue (RGB) may be used to define 16.4 million colors in the visible spectrum of light using 8 bits or 1 byte of computer information per Pixel. Other popular Color Spaces include but are not limited to YUV (luminance, chrominance and saturation), Y—Pb—Pr (luminance, blue minus luminance, red minus luminance) and CMYK (cyan, magenta, yellow and black).

Pixel—A singular dot of included color that is part of a mosaic of similar dots in a matrix that defines a seamless picture when viewed at a known distance.

Resolution—The definition of the amount of pixels in an image measured in horizontal and vertical dimensions along with a density of Pixels generally expressed in dots-per-inch (dpi). Common resolutions for Video are 720×480, 320×240 and 640×480. Video typically has the dpi of 72.

Aspect Ratio—The ratio of the horizontal to the vertical dimension for an image or Video. Typical aspect ratios are 4×3 often referred to as standard definition (SD) and 16×9 often referred to as high definition (HD).

Channel/Feed/Stream—The aggregated time line of video program content that is assembled by a content rights holder or the individual user that allows for continuous broadcast images and audio. This feed is comprised of Video selections tied together generally in the construct of a show or program. A feed or channel may be interactive allowing for the end user to affect the sequence of images commonly referred to as "trick play". Examples of trick play would include fast forward, fast reverse, pause and rewind. A feed may also contain textual or ancillary data that may or may not be displayed by default on the screen. Sometimes this ancillary information will be interpreted by the playback device as information to be displayed visually. An example of this would be closed captioning.

Macroblocking—The concept of dividing the visual resolution of a video feed into smaller blocks generally but not limited to rectangles for the purpose of Compressing or referencing sub sections of a Video discretely.

Set Top Box (STB)—A client device used for accessing content provided by the Network. This device may include hardware specific to image and video rendering or may be software driven using a general purpose-computing device.

Compress/Compression—A technique that utilizes mathematical or statistical commonalities in the image or video stream to reduce the amount of data required to transmit and reconstruct the data. There are three major schools of Compression techniques. The first utilizes statistical self-similarity in the stream to reduce the transmission size. The second method of reduction is to discard detailed image information within a frame of video that is similar to adjacent parts of the image. This technique was popularized with JPEG (Joint Photographic Experts Group) file Format. For example, in this scenario if 10 pixels of near blue color exist in a horizontal row the Compression algorithm may decide to store one pixel's complete color information and then tell the reconstruction algorithm to reconstruct ten more identical pixels. In some cases the reduction is loss-less in that only identical pixels are sampled in this way. The ratio of the Compression is related to the broadness of what pixels are close enough in Color Space to be considered identical in the reconstruction phase and the heterogeneous nature of the image. The third popular method of Compression is to Macroblock a Video stream and by comparing a block to blocks that have occurred temporally before or after the current block avoid re transmitting that block's data in the stream. Sometimes translation of a block's position on the screen is also used. The overall size of the data stream is reduced by not retransmitting sections of the video that are "similar enough" to other sections already (or possibly in the future) transmitted. This technique was popularized by the MPEG (Motion Pictures Expert Group) consortium. Most modern Compression relies on a combination of the above methods. There are many other Compression techniques that rely on different and in many cases proprietary algorithms.

Metadata—Statistical or annotative information relating to the content in a Video Stream. This information may be used to better identify the content present in the feed. The types of data typically included in Metadata would be author, content rights holder, theme or genre of the feed, actors or actresses shown in the feed, production information and content rating. There is no practical limitation to the amount and type of Metadata that may be associated with a stream.

Thus, a need has long been felt for a device that provides a user with an improved methodology for accessing, reviewing, or interacting with multiple channels of video. A need has especially been felt for an improved device that provides the user with the ability to sample multiple streams of video simultaneously.

We now turn to an additional aspect of the present telecommunication system, specifically, retrofitting or installing specialized telecommunications resources in a MDU Retrofitting and Reconfiguring Risers in Older Buildings FIG. 14 illustrates several systems associated with traditional risers in a MDU. Residential buildings built prior to the late 1980s were constructed with risers (also referred to as ducts or conduits in various building codes) to provide public telephone service, house telephone/buzzer entry systems, television signal distribution and electrical power distribution. Basic riser size, design and construction materials varied based upon local building codes and the specific use of the riser. Spare risers were generally not required by local building codes and were therefore not installed. Due to the absence of unused risers, it is difficult to upgrade existing high-rise buildings with increased electrical service, high-speed communications, fire annunciation, hard-wired smoke detectors, hard-wired heat detectors, emergency power and life safety systems. The installation of new risers in high-rise buildings is costly due to: i) the need to drill through the concrete slab of each floor to create vertical risers; ii) the need to create conduits for horizontal wiring runs and iii) the need to accommodate residents during demolition and construction.

Public Telephone Risers:

Risers for public telephone wiring 1401 were generally constructed to run vertically the entire height of the building, as shown in FIG. 14. At various locations, the telephone risers run through distribution panels 1402 in stairwells and landings where telephone pairs are split-off and run through smaller horizontal and vertical conduits to provide analog telephone service to nearby floors, units and offices. The number of pairs serving a unit determines the number of telephone lines available on a ratio of one telephone pair per one telephone line. In order to reduce expense, contractors often used soft conduit (wiring in a flexible plastic sleeve) rather than rigid metal conduit. During construction, telephone cables were laid on horizontal and vertical runs prior to pouring concrete. Concrete was then poured over or around the wire to seal it in place. These wires may not generally be removed without opening the concrete floors. If the number of telephone pairs is inadequate for modern use, it is difficult to increase telephone service due to the lack of vertical riser space and horizontal conduit space to the unit. Additionally, much of the telephone wiring is incompatible with DSL and data communications due to inadequate twists and or general deterioration due to age.

Television Signal Distribution

In older buildings, master antennas (MATV) 1403 were located on the roof to provide improved broadcast television reception to units. In many MATV designs, vertical risers using hard conduit were installed beginning in the penthouse area and ending at the lowest floor where residential units are located. These MATV risers ran within the walls of every residential unit and contained single coaxial cable runs that were split at each unit before being distributed to the next unit. This wiring plan is commonly referred to as "Loop Wiring". Generally, these conduits are ½" to ¾" and may only accommodate a small number of coaxial cables. Current cable TV technology does not support bidirectional communications services such as cable modems over loop wiring. Accordingly, new risers have to be installed to provide dedicated wiring such as coaxial cable to each unit. This type of wiring system is referred to as "Home Run" wiring.

Electrical Service Upgrades

In older buildings, the power consumption of modern appliances has exceeded the design limits of electrical systems. In order to increase electrical service, new risers or vertical power cables have to be brought to each floor. In most buildings, existing electrical closets lack space to accommodate new electrical service due to the presence of electrical meters 1405. Accordingly, many building owners resort to reconfiguring common areas and or residential units in order to create new electrical closets with upgraded electrical service. This process is expensive, time consuming and diminishes the amount of rentable or salable square footage available.

Emergency Power

In many older high-rise buildings, local codes are requiring the installation of emergency power generators to provide power to emergency lighting, communication and elevators in the event of a power failure or other emergency. Most local codes require that location of emergency generators at or below grade level. Many of the power distribution feeds for elevators and emergency lighting are located in building penthouses. Older buildings were not designed with risers to connect emergency generators with penthouse electrical equipment. Accordingly, new emergency power risers need to be installed requiring core drilling through concrete slabs. Additional cost is incurred when installing these risers due to the need to enclose and decorate riser areas located in common areas.

Fire Annunciation Systems

Many building codes require fire annunciation systems whereby fire personnel may instruct residents in the event of an emergency. In older buildings, hard conduit was not constructed for fire annunciation systems. In order to install fire annunciation systems in these buildings, fire departments require dedicated equipment with battery backup and special fire rated cable or hard conduit. In order to install building annunciation systems, new vertical and horizontal risers or cable runs are required including floor penetrations and wall penetrations in units. The costs of installing new risers and hard conduit or fire rated cable is significant due to the lack of riser space.

Hard-Wired Smoke Detectors

Many building codes require hard-wired smoke detectors whereby the effectiveness of smoke detectors does not rely on residents replacing batteries. In older buildings, conduit and wiring was not installed to power hard-wired smoke detectors. In order to install hard-wired smoke detectors, new vertical and horizontal risers or wiring runs are required including floor penetrations and wall penetrations in units. The cost of installing this system is expensive due to the lack of riser space and conduits.

Hard-Wired Heat Detectors

Many building codes require hard-wired heat detectors whereby the effectiveness of heat detectors does not rely on residents replacing batteries. In older buildings, conduit and wiring was not installed to power hard-wired heat detectors. In order to install hard-wired heat detectors, new vertical and horizontal risers or wiring runs are required including floor penetrations and wall penetrations in units. The cost of installing this system is expensive due to the lack of riser space and conduits.

Security Cameras and Building Automation

In older buildings, coaxial cables are used to transmit security camera feeds. Often, coaxial cables are run through emergency stairwells to bring camera feeds 1416 to the penthouse distribution panel and then to distribute signals to the front desk. In many urban areas, fire departments are requiring the removal of coaxial cables from emergency stairwells due to safety concerns. Similarly, building automation and alarm systems are generally connected to alarm panels located by the front entrance of buildings. Many of the automation and alarm systems are monitoring equipment located in the penthouse of buildings and use emergency stairs to connect to monitoring panels. In older buildings, no vertical risers were installed for security camera feeds and building automation wiring. Accordingly, new risers are required to retrofit buildings with these capabilities.

Constructing Space Efficient Risers in New Construction Buildings

The construction of new buildings with advanced communications, electrical systems, life-safety and building automation systems pose significant challenges for engineers, real estate developers and property owners. In new construction, construction costs may range from $100-$300 per square foot. The square foot rental value of offices and apartments may exceed $25-$60 per square foot while the value of residential condominiums and cooperatives may exceed $700-$1,000 per square foot.

The installation of electrical rooms and communications closets in new construction consumes significant space that could otherwise be added to rental space or sold as residential living space. The installation of dedicated wiring for telephone, cable TV, fire annunciation, hard-wire smoke detectors, building automation and security cameras also consumes significant space thereby reducing the rentable or saleable square footage. Additionally, the cost of labor and wiring for these systems is significant.

Thus, it is desirable to have a communications network that combines features such as voice, video and data services, electrical closets, security cameras, building automation, fire annunciation systems, hard-wired smoke detectors, hard-wired heat detectors, electrical meters and other systems. Such a communications network may especially be desirable in a high-rise MDU, where the value per square foot is high and the space required to support and service several different systems may be eliminated thereby allowing the space to be sold or rented.

SUMMARY OF THE INVENTION

An embodiment of the present invention provides a telecommunications network having a video program guide (VPG) allowing a user to interact with multiple streams of video in real time. The VPG includes techniques for displaying multiple streams of data on a single screen for a user.

Additionally, the telecommunications network provides the advantage that, through the utilization of an integrated Ethernet communication system, much of the wiring and space required for voice, video and data services, electrical closets, security cameras, building automation, fire annunciation systems, hard-wired smoke detectors, hard-wired heat detectors, electrical meters and other system may be reduced significantly or eliminated.

These and other features of the present invention are discussed or apparent in the following detailed description of the embodiments of the invention.

BRIEF DESCRIPTION OF THE DRAWINGS

FIG. 7 illustrates a combined view of the VPG and a view of the VPG showing only the components of the VPG generated at the server.

FIG. 8 illustrates the total image recombination technique used to generate a video grid.

DETAILED DESCRIPTION OF THE EMBODIMENTS

Figure 1:
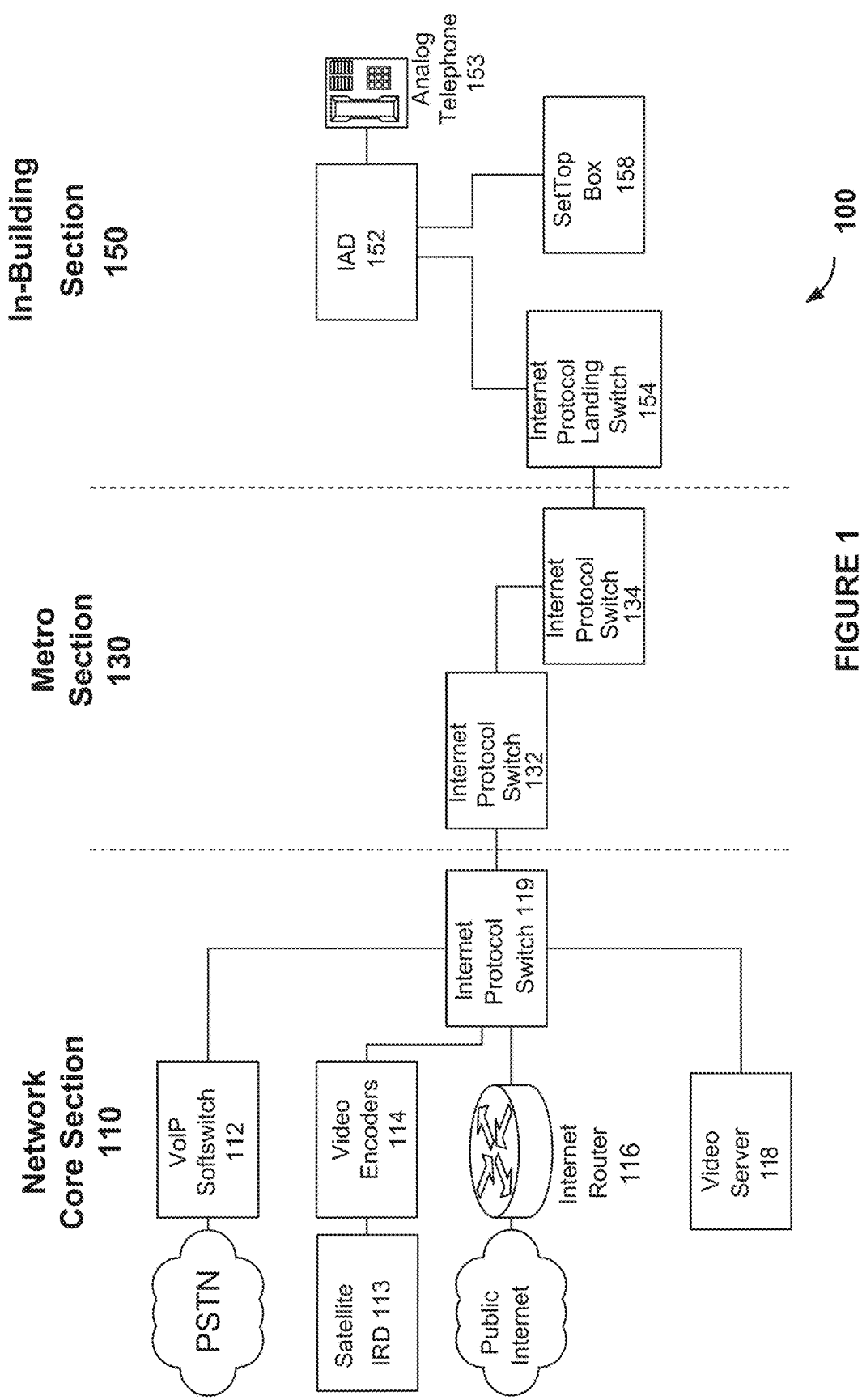
FIG. 1 lillustrates the first embodiment of a next generation telecommunications network in a multi-dwelling unit (MDU) high rise building.

FIG. 1 illustrates the first embodiment of a next generation telecommunications network 100 in a multi-dwelling unit (MDU) high rise building. Network 100 includes a network core section 110, a metro section 130, and an in-building section 150. Network core section 110 includes a VoIP (Voice over IP) Softswitch 112, multiple satellite integrated receiver/decoders (IRDs) 113, multiple video encoders 114, multiple Internet routers 116, multiple Video Servers 118, and Internet protocol switch 119. Metro section 130 includes Internet protocol switch 132 and Internet protocol switch 134. In-building section 150 includes Integrated Access Device (IAD) 152, analog telephone 153, Internet protocol landing switch 154, and Set Top Box 156.

In network core section 110, Internet protocol switch 119 is in electrical communication with VoIP Softswitch 112, in electrical communication with video encoders 114, in electrical communication with Internet routers 116, and in electrical communication with video server servers 118. VoIP Softswitch 112 is in electrical communication with the PSTN. Video encoders 114 are in electrical communication with IRDs 113. Internet routers 116 are in electrical communication with the public Internet.

In metro section 130, Internet protocol switch 132 is in electrical communication with Internet protocol switch 134 and Internet protocol switch 119 from network core section 110. Internet protocol switch 134 is also in electrical communication with Internet protocol landing switch 154 from in-building section 150.

In in-building section 150, IAD 152 is in electrical communication with Internet protocol landing switch 154, analog telephone 153, and set top box 156. Internet protocol landing switch 154 is also in electrical communication with set top box 158.

In operation, a time division multiplexed telephone signal is received from the PSTN by VoIP softswitch 112. It is converted into VoIP format packets, addressed to IAD 152 and the packets are passed to Internet protocol switch 119. Internet protocol switch 119, examines the packets' addresses and passes them to Internet protocol switch 132. Internet protocol switch 132 examines the packets' addresses and passes them to Internet protocol switch 134. Internet protocol switch 134 examines the packets' addresses and passes them to Internet protocol landing switch 154. Internet protocol landing switch 154 examines the packets' addresses and passes them to IAD 152. IAD 152 converts the packets to an analog telephone signal and passes the signal to analog telephone 153. Analog telephone 153 converts the analog telephone signal to sound waves at the telephone earpiece. Simultaneously, sound waves present at the mouthpiece of analog telephone 153 are converted to an analog telephone signal and passed to the IAD. This signal is passed back up the network in exactly the opposite direction and fashion as just described and all signals are converted in reverse at their corresponding points.

A digitized video signal is received from a satellite by IRD 113. The signal is then demodulated, demultiplexed, and decrypted by IRD 113 and passed to video encoder 114. Video encoder 114 encrypts, packetizes, and converts the signal to an IGMP format and passes the packets on to Internet protocol switch 119. Internet protocol switch 119 examines the packets' addresses and passes them to Internet protocol switch 132. Internet protocol switch 132 examines the packets' addresses and passes them to Internet protocol switch 134. Internet protocol switch 134 examines the packets' addresses and passes them to Internet protocol landing switch 154. Internet protocol landing switch 154 examines the packets' addresses and passes them to IAD 152, which passes the packets to set top box 156. Set top box 156 decrypts and converts the packets to an analog television signal for display on a television set. Channel change and other commands travel from set top box 156 along the same path as the television signal but in the opposite direction. These commands are received by Internet protocol switch 119 in order to change the contents of the video passing down to set top box 156.

A digitized video signal is encrypted and stored on Video server 118. Video server 118 packetizes the video and passes the packets on to Internet protocol switch 119. Internet protocol switch 119 examines the packets' addresses and passes them to Internet protocol switch 132. Internet protocol switch 132 examines the packets' addresses and passes them to Internet protocol switch 134. Internet protocol switch 134 examines the packets' addresses and passes them to Internet protocol landing switch 154. Internet protocol landing switch 154 examines the packets' addresses and passes them to IAD 152, which passes the packets to set top box 156. Set top box 156 decrypts and converts the packets to an analog television signal for display on a television set. Commands travel from set top box 156 along the same path as the video signal but in the opposite direction. These commands are received by video server 118 in order to change the contents of the video passing down to set top box 156.

Internet packets from the public Internet are received by Internet router 116 and are passed to Internet protocol switch 119. Internet protocol switch 119 examines the packets' addresses and passes them to Internet protocol switch 132. Internet protocol switch 132 examines the packets' addresses and passes them to Internet protocol switch 134. Internet protocol switch 134 examines the packets' addresses and passes them to Internet protocol landing switch 154. Internet protocol landing switch 154 examines the packets' addresses and passes them to IAD 152, which makes them available to any Internet enabled communication device connected to IAD 152.

In the alternative, video encoders 114 may also receive an analog video signal from IRDs 113 and perform a digitization process in addition to its other stated processes. Video encoders may also receive an analog or digital video signal from an antenna or via fiber optics or other terrestrial system and perform a digitization process (if necessary) in addition to its other stated processes. The digitization may be in the form of MPEG2, MPEG4, or any other form of digitized video. Also, metro section 130 may include any number of Internet protocol switches, either in parallel, in series, and/or in a loop configuration. Additionally, any Internet protocol enabled device may connect to IAD 152.

In other embodiments, all electrical communications so described may be optical or wireless communications in certain configurations. Also, set top box 156 may be in direct electrical, optical, or wireless communication with Internet protocol landing switch 154 without first traveling through IAD 152.

Also, in addition to the structure shown in FIG. 1, in-building section 150 may contain any number of groups of shown devices. Additionally, analog telephone 153 may also be a VoIP telephone and may be in electrical, optical, or wireless communication with IAD 152 or directly with Internet protocol landing switch 154. Further, any number of Internet protocol switches may be between Internet protocol landing switch 154 and IAD 152. Any of these Internet protocol switches may be in direct electrical, optical, or wireless communication with set top box 156 or VoIP telephone or any other Internet protocol enabled device.

Further variations include: 1) any or all Internet protocol switches may alternatively be DSL modems, 2) Network core section 110 may include any Internet enabled device and be in electrical, optical or wireless communication with Internet protocol switch 119, 3) Video encoders 114 may be connected to analog or digital television antennae, 4) There may be multiple network core sections 110, 5) in-building section 150 may be commercial, industrial, retail, or residential MTU or MDU. Further, one network may be shared among multiple buildings or MDUs, 6) in-building section 150 may contain multiple Internet protocol switches in addition to Internet protocol landing switch 154. Set top box 156 may have a digital connection to a television set.

In a first aspect of the present telecommunications network, the network provides a television viewer with an improved viewing experience by providing an improved way to navigate among a set of video and/or audio channels and programs using video, graphics, image, and audio cues to assist in channel selection as well as providing the viewer the ability to watch many video channels simultaneously.

One embodiment permits the user to utilize a much greater set of cues than traditional numerical and textual ones to locate, identify, and select a channel of interest from among a broad selection of channels. The cues described here include video, image, audio, textual, and graphical ones. By allowing users to utilize more of their sensory capabilities when choosing channels, this embodiments of the invention improves the speed and accuracy of channel selection thus improving the quality of the viewing and/or listening experience. In several embodiments, this invention presents a television user interface that includes active video elements, active audio elements, static image elements, and dynamic graphical and textual elements in a variety of configurations so as to allow a user to quickly locate a desired channel and tune to it. It also allows a user to watch many video channels simultaneously without the need for multiple television sets. This is a function found to be especially valuable to sports enthusiasts since multiple sporting events frequently occur and are shown simultaneously across multiple channels.

This viewer interaction aspect of the communications network includes two primary parts. The first is the user interface design and navigation methods. The second is the backend server processes and algorithms used to create and present the user interface elements over an IP-based network in an economical fashion. The user interface design and navigation methods include multiple versions that have the commonality of allowing a user the ability to select a desired channel or to simultaneously watch several different channels on an IP-based network. The channels may either be pre-recorded and available on a server or they may be "live", whereby they are encoded into some digital media Format. The distribution methodology of the network is further discussed below with regard to the second part of the viewer interaction aspect of the communications network.

Figure 2:
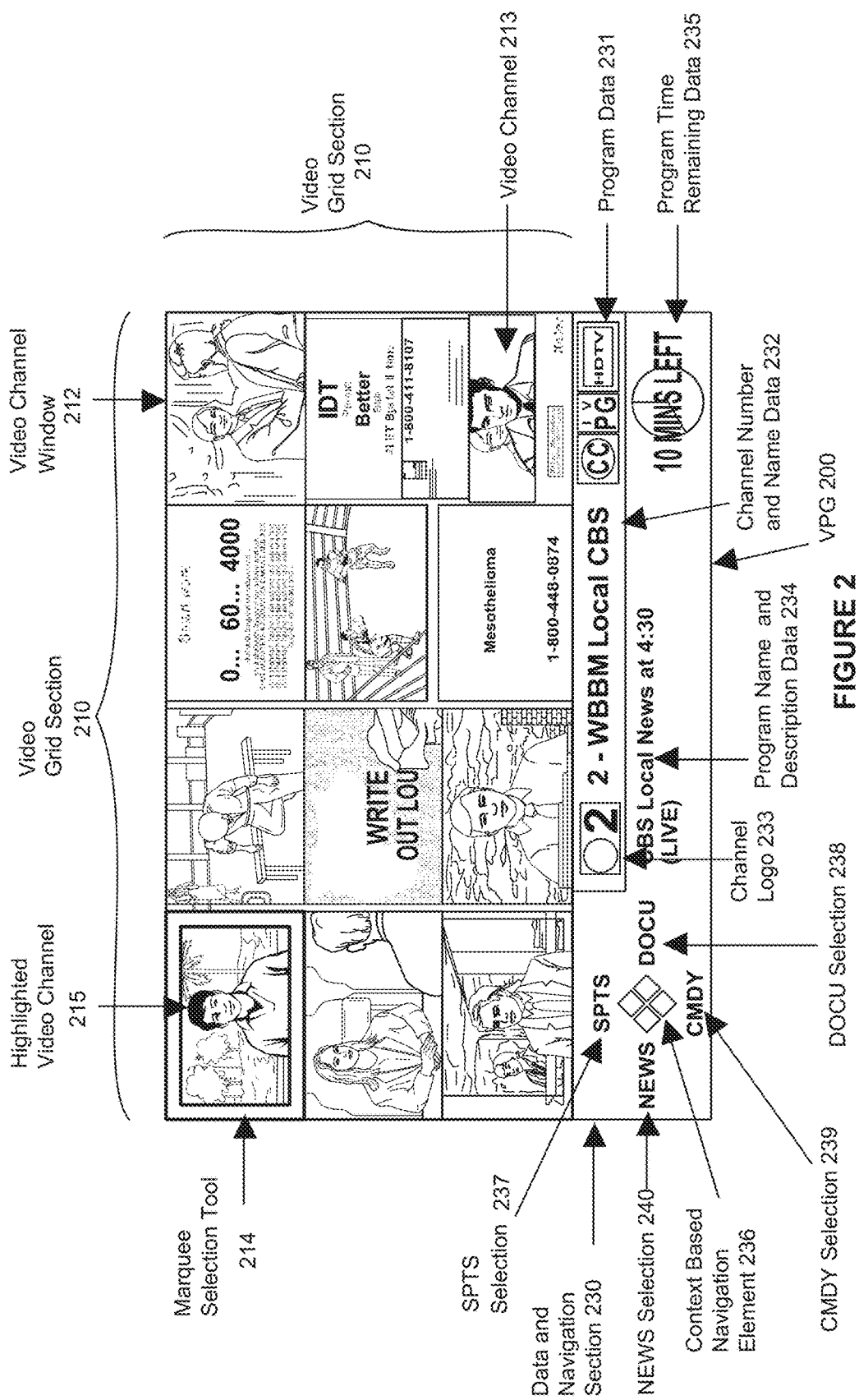
FIG. 2 illustrates the first embodiment of a Video Program Guide (VPG) including an image of a video grid version of a VPG interface along with a variety of features.

FIG. 2 illustrates the first embodiment of a Video Program Guide (VPG) 100 including an image of a video grid version of a VPG interface along with a variety of features. VPG 200 includes a video grid section 210 and a data and navigation section 230. Video grid section 210 includes 12 video channel windows 212 and marquee selection tool 214. Each video channel window 212 has a corresponding video channel 213 which is the video content seen within each video channel window 212. Video grid section 210 includes highlighted video channel 215, which is also an element of the 12 video channels 213. Data and navigation section 230 includes program data 231, channel number and name data 232, channel logo 233, program name and description data 234, program time remaining data 235, and context based navigation element 236. Context based navigation element 236 contains 4 selections—SPTS selection 237, DOCU selection 238, CMDY selection 239, and NEWS selection 240.

In video grid section 210, the 12 video channel windows 212 are arranged in a 4 horizontal by 3 vertical grid format. Each video channel window 212 displays a different video channel 213. Marquee selection tool 214 forms a frame visually on top of one and only one of the 12 video channel windows 212 at a time. The video channel with the marquee selection tool 214 designated video channel window 212 is designated as highlighted video channel 215. Data and navigation section 230 is appended to the bottom of video grid section 210. Context based navigation element 236 occupies the left side of data and navigation section 230. Within context based navigation element 236, SPTS selection 237 is on top, DOCU selection 238 is on the right, CMDY selection 239 is on the bottom, and NEWS selection 240 is on the left. Channel logo 233 is next to channel number and name data 232 which is next to program data 231. All three elements are located in the top right portion of data and navigation section 230. Program name and description data 234 is located below channel logo 233 and to the left of context based navigation element 236. Program time remaining data 235 is in the bottom right hand corner of data and navigation section 230. Channel logo 233, channel number and name data 232, program data 231, program name and description data 234, and program time remaining data 235 are contextually connected to highlighted video channel 215, in that their data describes highlighted video channel 215.

In operation, a specific set of 12 video channels 213 is displayed in video channel windows 212 as received from network 100 as seen in FIG. 1. Highlighted video channel 215 is designated by placing marquee selection tool 214 on top of one of the video channel windows 212. Channel logo 233 displays the logo associated with highlighted video channel 215. Similarly, program name and description data 234, channel number and name data 232, and program data 231 all display data associated with highlighted video channel 215. Program time remaining data 235 displays the amount of time left until the end of the program displayed in highlighted video channel 215. As marquee selection tool 214 is moved from the top of one video channel window 212 to another video channel window 212, channel logo 233, program name and description data 234, channel number and name data 232, and program data 231, all adjust to display data associated with the content of the new highlighted video channel 215. Similarly, the audio stream associated with highlighted video channel 215 is heard. Marquee selection tool 214 may be moved one video window 212 at a time in an up, down, left, right manner. Marquee selection tool 214 is moved through the use of a set top box remote control.

The specific set of 12 video channels 213 being displayed may be replaced by a new set of video channels 213 through the use of context base navigation element 236. Selection of SPTS selection 237 will replace video channels 213 with a set of sports oriented video channels 213. Selection of DOCU selection 238 will replace video channels 213 with a set of documentary oriented video channels 213. Selection of CMDY selection 239 will replace video channels 213 with a set of comedy oriented video channels 213. Selection of NEWS selection 240 will replace video channels 213 with a set of news oriented video channels 213.

If at any time, marquee selection tool 214 is moved beyond the top, bottom, left, or right edges of video grid section 210, the 12 video channels 213 will adjust so as to accommodate new video channels 213. If marquee selection tool 214 is moved beyond the left edge of video grid section 210, the 9 leftmost video channels 213 will each move one video channel window 212 to the right. The rightmost 3 video channels 213 will disappear. Three new video channels 213 will occupy the leftmost 3 video channel windows 212. Similar accommodations will be made if marquee selection tool 214 is moved beyond the top, bottom, or right edges of video grid section 210.

If at any time, the user presses select on the remote control, the entire video program screen and all of its elements will be replaced with a full screen version of highlighted video channel 215.

Alternatives to the VPG 200 include the following. First, video channel grid 210 may contain any number of video channel windows 212 in any form factor, such as a 4×4 channel display, a 5×5 channel display, or any other display desirable by a user. Second, video channel windows 212 are not constrained to be the same size. For example, the currently selected channel window 212 may be enlarged or otherwise highlighted. Third, marquee selection tool 214 navigation beyond the edges of video channel grid 210 may cause all video channel windows 212 to be replaced with a completely new set of video channels 213. Fourth, data and navigation section 230 may include additional data relevant to highlighted video channel 215. Fifth, data and navigation section 230 may be located in a different portion of the screen, such at the top, sides or center of the screen. Sixth, all elements of data and navigation section 230 may be rearranged to display in different areas of the screen or to display by subject or in accordance with some other user-selected methodology. Seventh, the VPG 200 need not include all the elements of data and navigation section 230. Eighth, data and navigation section 230 may be commanded to disappear and be replaced with additional video channel windows 212. Finally, context based navigation element 236 may contain different or additional selections and may be in any order.

Figure 3:
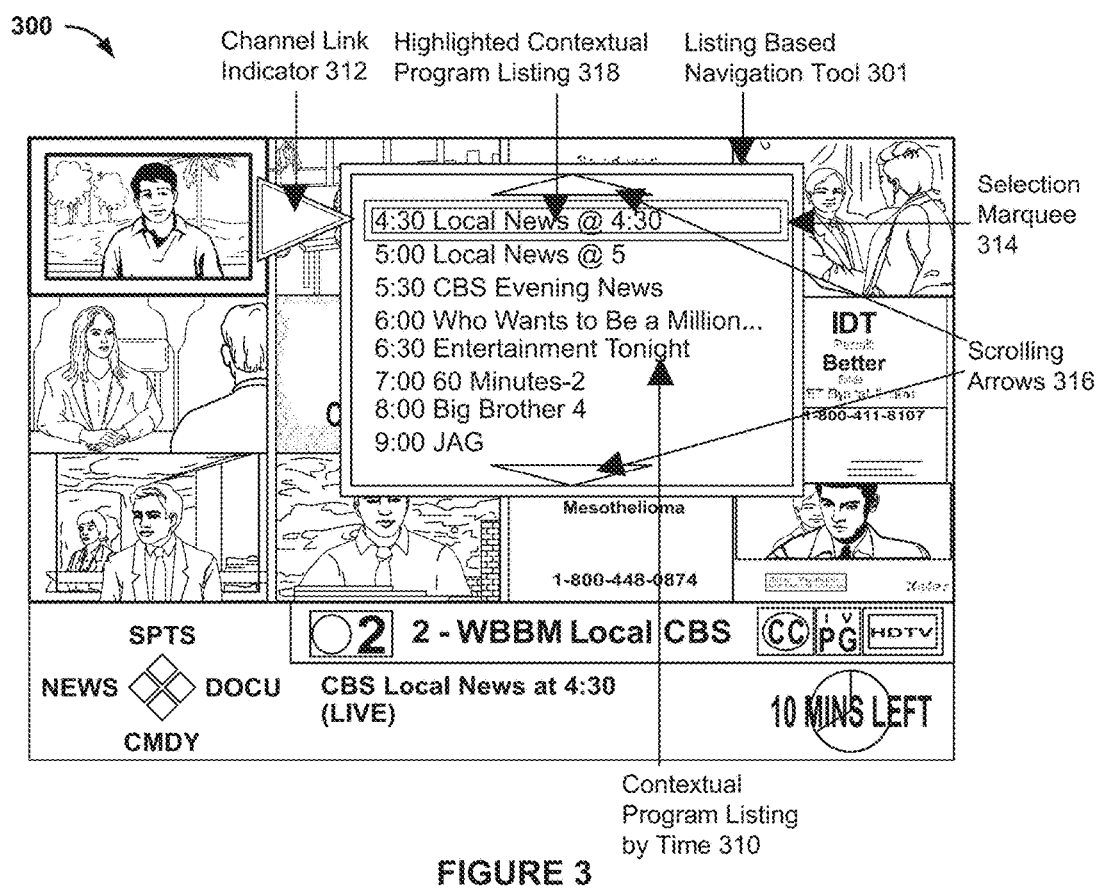
FIG. 3 illustrates a display of a listing based navigation tool for the video program guide VPG as shown in FIG. 2.

FIG. 3 illustrates a display 300 of a listing based navigation tool 301 for the video program guide VPG 200 as shown in FIG. 2. That is, FIG. 3 shows the same VPG interface as FIG. 2 with the addition of a contextual text-based program guide element, as further discussed below.

Listing based navigation tool 301 includes a contextual program listing by time 310, a channel link indicator 312, a selection marquee 314, 2 scrolling arrows 316, and highlighted contextual program listing 318. Contextual program listing by time 310 contains items with both a scheduled airtime and a program name. Visually behind listing based navigation tool 300 is video program guide VPG 200. All of the elements of VPG 200 as seen in FIG. 2 are preferably present.

Channel link indicator 312 is contextually connected to highlighted video channel 215. It is also visually connected to highlighted video channel 215 in that it is placed on the screen so as to seem to be pointing directly from highlighted video channel 215. Contextual program listing by time 310 runs vertically down the center of listing based navigation tool 301 and is contextually connected to highlighted video channel 215 in that it is effectively a window into a much larger list of all programs shown prior and scheduled to be shown later on that video channel. Selection marquee 314 forms a frame around one item in contextual program listing by time 310 thus designating it highlighted contextual program listing 318. Highlighted contextual program listing 318 is contextually connected to highlighted video channel 215 as well as to the time of day. Scrolling arrows 316 are contextually connected to contextual program listing by time 310.

In operation, the listing based navigation tool 301 is displayed in front of VPG 200 by triggering a command on a set top box remote control. Selection marquee 314 may be moved up and down the contextual program listing by time 310 using a set top box remote control thereby changing the highlighted contextual program listing 318. If selection marquee 314 is moved beyond the top of contextual program listing by time 310, contextual program listing by time 310 scrolls down, thus revealing a new listing from the next earlier time period and dropping off the listing for the latest time shown. If selection marquee 314 is moved beyond the bottom of contextual program listing by time 310, contextual program listing by time 310 scrolls up, thus revealing a new listing from the next later time period and dropping off the listing for the earliest time shown. In this manner, the user may scroll through the entire viewing schedule associated with highlighted video channel 215.

When the user has found the desired listing in contextual program listing by time 310, he may select it by first moving selection marquee 314 over the desired listing, thereby making it the highlighted contextual program listing 318 and then pressing a button on the remote control. If the selected item represents a program that has previously aired, the user will be taken to a recording of that program. If the selected item represents a program that has not yet aired, the program is recorded when it does air. If the selected item represents the program currently airing, the user is taken to a full screen version of that program and VPG 200 and listing based navigation tool 301 disappears. At any time the user may make VPG 200 and listing based navigation tool 2100 disappear by selecting a command on the remote control.

Alternatives to the listing based navigation tool 301 described above include the following. First, selection marquee 314 may be moved using a wired navigation method, push buttons on the set top box itself, or other remote control device. Second, contextual program listing by time 310 may contain additional or fewer elements than just the program name and scheduled air time. Third, contextual program listing by time 310 may run horizontally instead of vertically. Fourth, contextual program listing by time 310 may be graphical instead of textual. Fifth, program selection using selection marquee 314 may cause any task related to highlighted contextual program listing 318 to occur.

Figure 4:
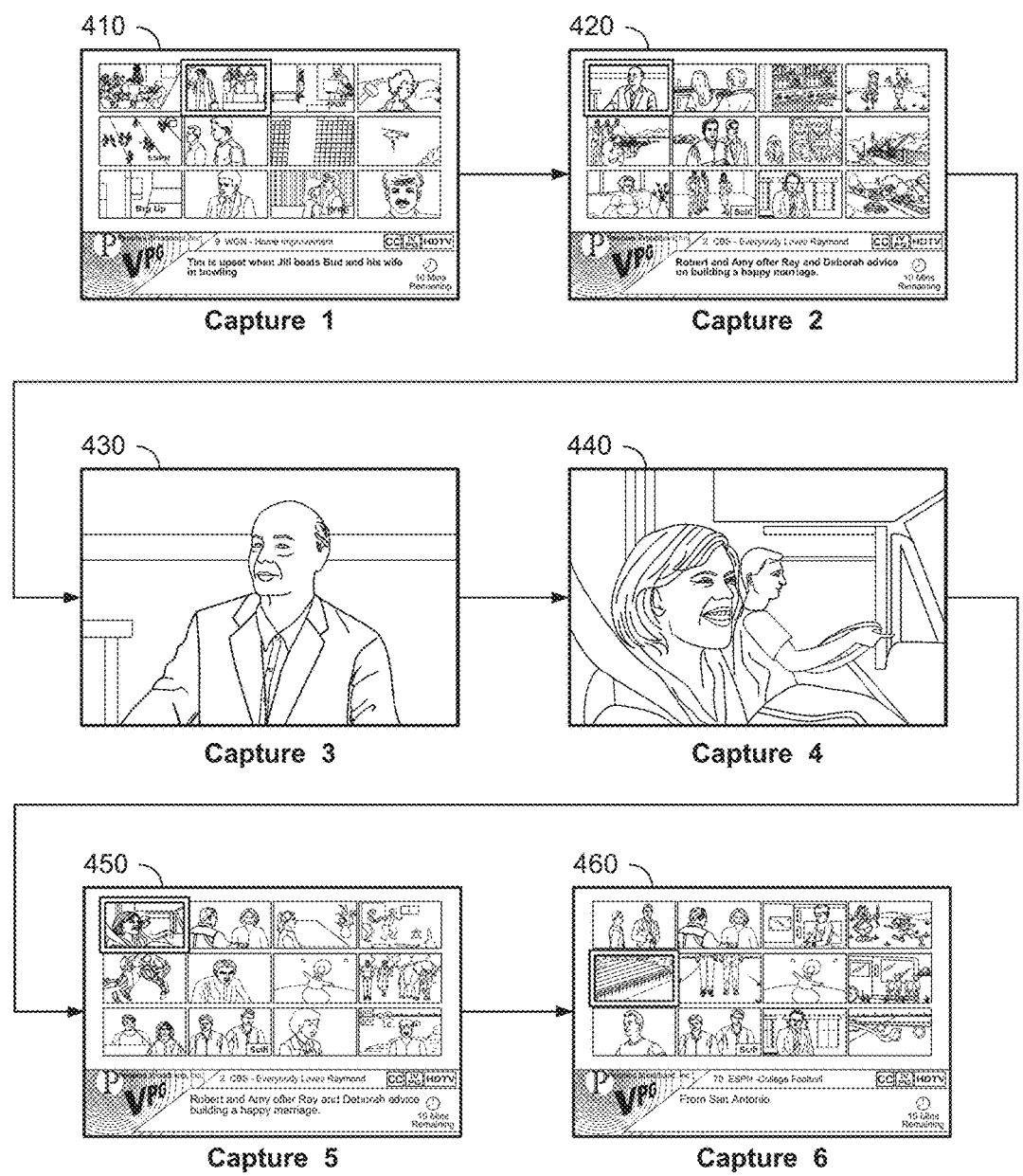
FIG. 4 depicts a series of screen images illustrating how the look of the user interface changes as a result of a typical sequence of user commands.

FIG. 4 depicts a series 400 of screen images illustrating how the look of the user interface changes as a result of a typical sequence of user commands. That is, FIG. 4 depicts the baseline interface in a sequence of frames sampled from the process a user may go through in order to select a feed.

Capture 1 410 of this drawing indicates a starting position of this VPG. The user has the $2^{nd}$ box from the left in the top row selected and is thus preferably hearing audio from that feed. The data at the bottom in a format similar to FIG. 2 is depicted at the bottom of the frame. In Capture 2 420 the user has moved the marquee over to the feed to the immediate left of the one he/she was viewing using his/her remote control device. This has changed the program information at the bottom of the screen and has also switched the audio feed to match the new channel selection. In this illustration, the user wishes to watch the channel he/she just highlighted so he/she hits the selection interface on his/her remote control device.

This "join" or "tuning" of the channel represented by the miniature video feed in the VPG is illustrated in Capture 3 430. Capture 4 440 is a simulation of a commercial that has just come on a time later than the initial "tuning" to this channel. The assumption is that the user does not wish to watch this commercial and would in fact like to return to the VPG. The Capture 5 450 illustrates this. The audio and the program data in the VPG as well as the marquee location will match the channel the user is returning from. The user then moved the marquee down from the joined position in the VPG and is now hearing the audio and may view the program data associated with the newly highlighted channel. This is detailed in Capture 6 460. The user is then be able to select this channel/program and watch it full screen or simply monitor the previous program/channel to return from commercial and then return to that channel.

Figure 5:
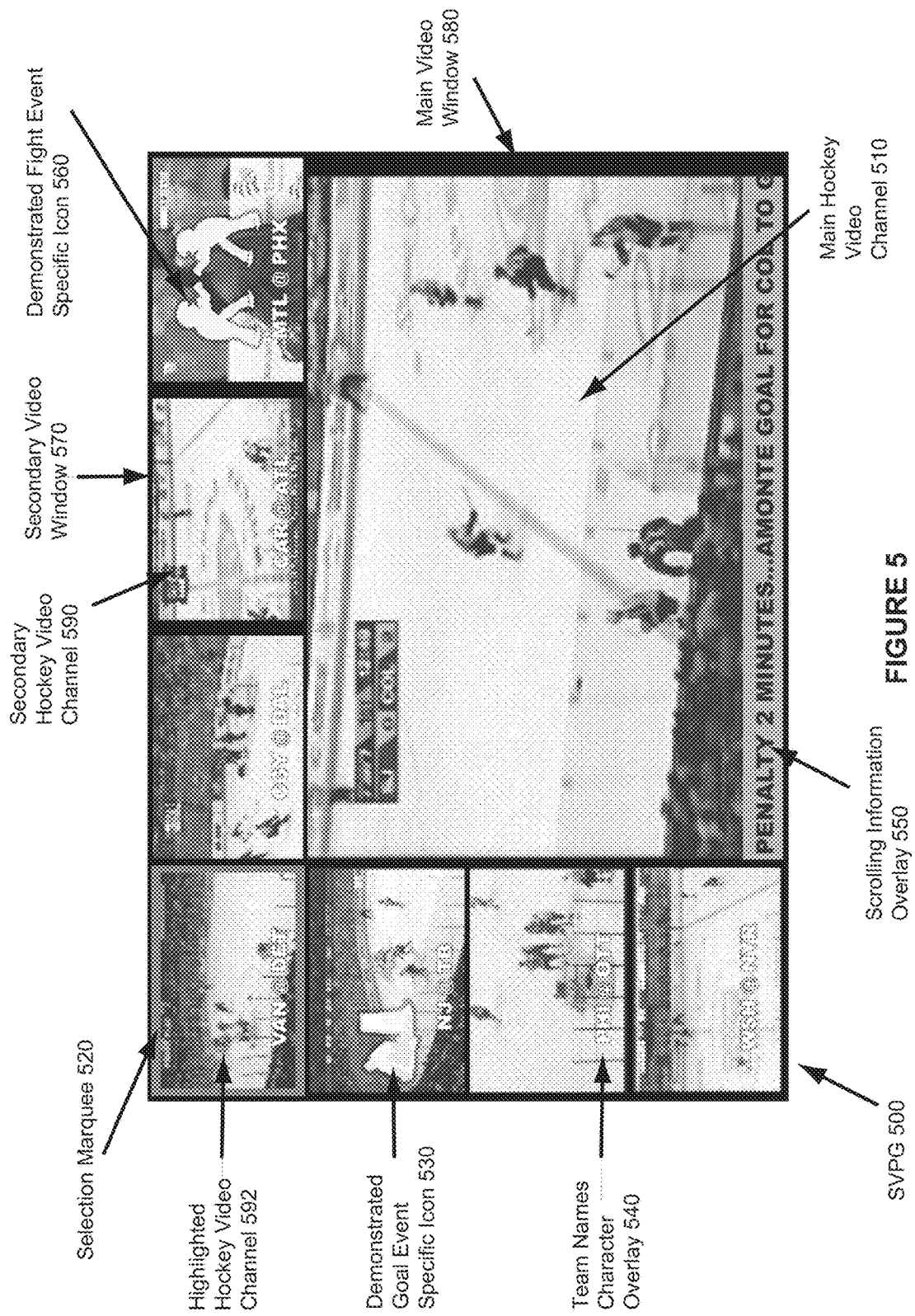
FIG. 5 illustrates the first embodiment of a sports version of a Video Program Guide (SVPG) interface along with a variety of features.

FIG. 5 illustrates the first embodiment of a sports version of a Video Program Guide (SVPG) 500 interface along with a variety of features. SVPG 500 includes main video window 580, which is 70% of the size of a full screen window, 7 secondary video windows 570, which are 20% of the size of a full screen window, selection marquee 520, demonstrated goal event specific icon 530, demonstrated fight event specific icon 560, team names character overlay 540, and scrolling information overlay 550. SVPG 500 also includes main hockey video channel 510, and 7 secondary hockey video channels 590, one of which is highlighted hockey video channel 592.

In SVPG 500, 7 secondary video windows 570 are arranged evenly along the left and top sides of the screen. 3 video windows are along the left side and 3 video windows are across the top with the seventh video window in the upper left hand corner of the screen. Each secondary video window 570 contains a secondary hockey video channel 590. Selection marquee 520 forms a frame visually on top of one and only one of the 7 secondary video windows 570 at a time. The secondary hockey video channel 590 located in the secondary video window 570 on top of which selection marquee 520 is placed is referred to as highlighted hockey video channel 592. In the bottom right hand corner of SVPG 500 is main video window 580. Main video window 580 contains main hockey video channel 510. Scrolling information overlay 550 runs horizontally across the bottom of main video window 580. It is contextually connected to main video channel 510 and provides textual information about that channel. Team names character overlay 540 runs horizontally across the bottom of secondary video window 570. It is contextually connected to secondary video channel 590 and provides the names of the teams playing in the game on that channel. Each secondary video window 570 and its corresponding secondary video channel 590 has its own team names character overlay 540, each displaying the names of the teams playing on that channel.

In operation, a specific set of 7 secondary hockey video channels 590 is displayed in secondary video windows 570 as received from network 100 as seen in FIG. 1. A specific main hockey video channel 510 is displayed in main video window 580 as received from network 100 as seen in FIG. 1. Highlighted secondary hockey video channel 592 is designated by placing selection marquee 520 on top of one of the secondary video windows 570. Selection marquee 520 may be moved one secondary video window 570 at a time left and right or up and down using arrow keys on a remote control. As selection marquee 520 moves to a new secondary video window 570, the secondary hockey video channel 590 associated with the new secondary video window 570 becomes the new highlighted secondary hockey video channel 592. When a user presses a select button on a remote control device, highlighted secondary hockey video channel 592 swaps places with main hockey video channel 510. The new secondary hockey video channel 592 is reduced in size to 20% of full screen. The new main hockey video channel 510 is increased in size to 70% of full screen.

When a goal is scored in the game being shown on a secondary hockey video channel 590, demonstrated goal event specific icon 530 will appear visually on top of that secondary hockey video channel. This appearance is triggered automatically by the update of a source of data about the game. The icon may catch the attention of the viewer causing him to possibly choose to swap that secondary hockey video channel 590 with the main hockey video channel 510 as previously described. If no such action is taken, the icon will disappear automatically after 10 seconds. Similarly, when a fight occurs in the game being shown on a secondary hockey video channel 590, a demonstrated fight event specific icon 560 appears visually on top of that secondary hockey video channel. This appearance is triggered automatically by the update of a source of data about the game. The icon may catch the attention of the viewer causing him to possibly choose to swap that secondary hockey video channel 590 with the main hockey video channel 510 as previously described. If no such action is taken, the icon disappears automatically after 10 seconds.

Alternatives to the SVPG 500 described above include the following. First, SVPG 500 may include video channels for any sport or any combinations of sports or any combination of channels with any or no relationship to one another. Second, event specific icons may exist for any event. Third, event specific icons may be manually or automatically triggered to appear in response to any event. Fourth, additional informative displays may appear on top of any secondary video channel 590 or main video channel 510. Fifth, numeric navigation may also be used by assigning each secondary video window 570 a number. Pressing that number on a remote control device will cause a video swap between that secondary video channel 590 and main video channel 510. Sixth, main video window 580 and secondary video windows 570 may have any size. Seventh, the number and orientation of secondary video windows 570 and main video window 580 may vary.

Figure 6:
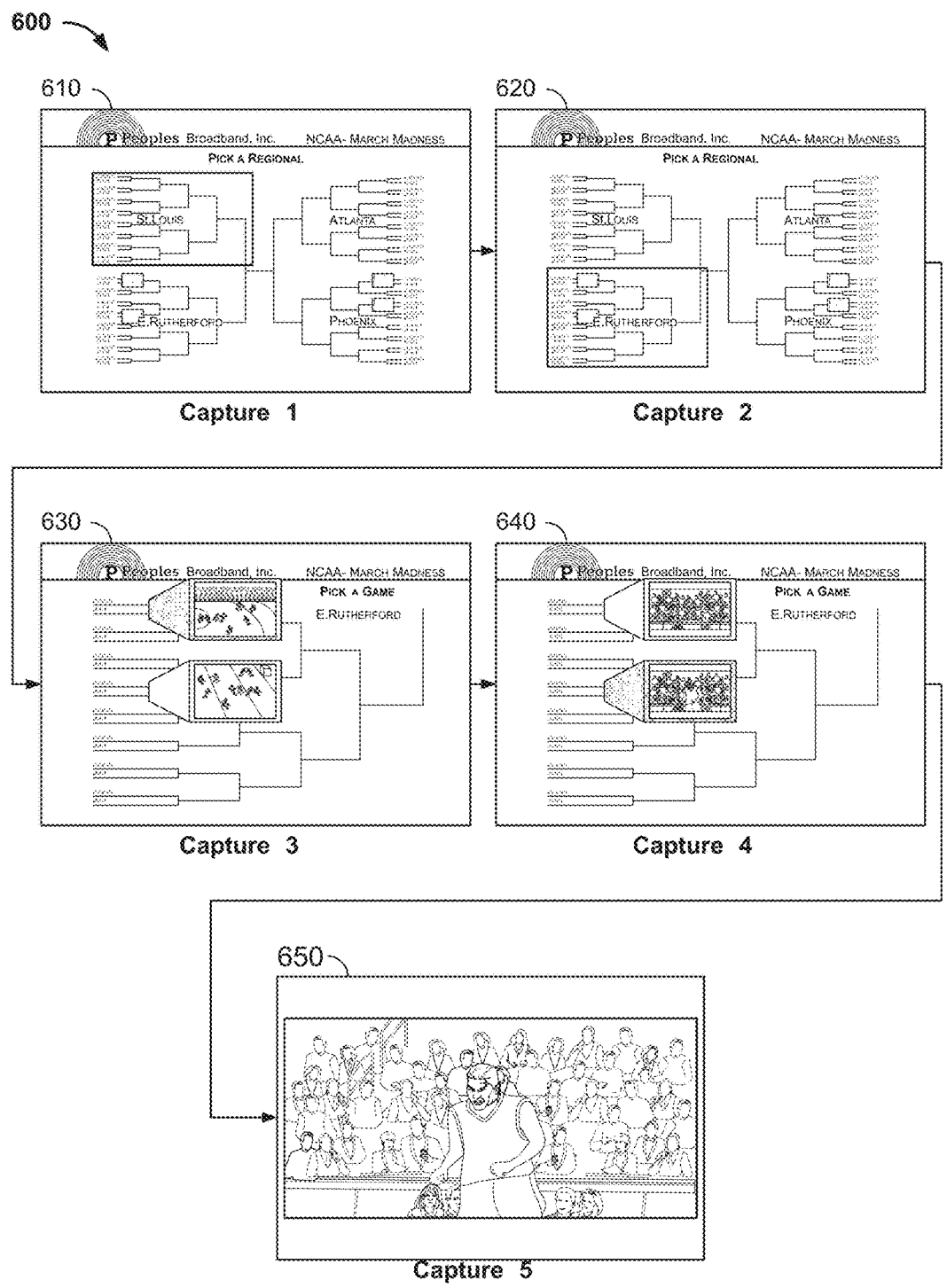
FIG. 6 depicts a series of screen images illustrating a VPG having a tournament interface for sports or events that use a "tableau" for promotion.

FIG. 6 depicts a series 600 of screen images illustrating a VPG having a tournament interface for sports or events that use a "tableau" for promotion. The example demonstrated is the NCAA March college tournament. The series 600 includes a series of captures 610-650. In capture one 610 the user is prompted to select the quadrant of the tableau that he/she wants to view. In smaller tournaments this step may not be necessary. The backdrop is the completed tableau preferably showing all the advancement that has occurred to date. To indicate channels are available icons or highlighted text may be used along with optional scaled channels as is demonstrated here. Previous games may be available in highlight form or in their entirety via video on demand servers. The user may be presented with this availability with similar visual and audio cues to the live channels.

Capture 2 620 shows the user selecting quadrant 3 or in this case the "East Rutherford" regional. Navigation and selection was accomplished using a remote control device as in the above interfaces. Once the user has made his/her selection he/she is presented with a new screen that is a "zoom in" of the previous one. This is demonstrated in Capture 3 630. The user is now presented with a larger version of the tableau quadrant selected in the previous step. This larger version may contain more statistical and data detail to take advantage of the larger screen availability. Games that are in progress may be represented by larger video channels. Selection of these games may be done by highlighting, iconic feedback or, a marquee, which is demonstrated here. Previous games may be selected along side current live ones. Capture 4 640 depicts the selection of the second live game in the conference by movement of the marquee using the remote control device. Once entering the quadrant video the user would be hearing the audio from the selected game. When the user decided which game he/she would like to view he/she simply hits the selection button on his/her remote control device to join the selected game full screen as is depicted in Capture 5 650. Multiple data sources are be used in the creation of the interface so current scores, highlight information, etc. may be displayed along side the video and audio content.

FIG. 7 illustrates a combined view 710 of the VPG and a view 720 of the VPG showing only the components of the VPG generated at the server. As mentioned above, portions of the VPG are generated at the set-top box and portions of the VPG are generated at a server, as shown in FIG. 1. The "back-end service" is created for the various VPGs when they are delivered as part of a consolidated video channel. For the purposes outlined here "backend" is defined as the service or services that create at least part of an offering to one or more customers as defined in the previous sections.

In FIG. 7, the lower portion of the screen that has the program information as well as the marquee is generated by the set top box (STB) as shown in Capture 1 710. Since this information is dynamic and may be specific to a user it is not included in the video that is sent to the STB. The video channel itself looks like Capture 2 720. There are two main tracks taken to assemble the video. The first is total image recombination and the second is for use when Macroblock Compression is used on the source video. Both of these techniques are described with the premise that the video is pre-encoded and being multicast along an IP network. Hardware and other transport systems may also be used but are not detailed here. This interface is designed to utilize the rendering capabilities of the STB to create images and graphics that may be hard to compress. It is also designed so that on a user-to-user basis information and display may be customized without the need to manipulate the underlying video channel.

FIG. 8 illustrates the total image recombination technique used to generate a video grid. FIG. 8 illustrates an exemplary first technique. This is a 2×2 grid of four channels. For simplicity there is no graphical overlay area set aside as there was in FIG. 7 although one may be generated in the same fashion as described in the above section.

The process shown in FIG. 8 starts by reconstructing full frames of video using what ever decode Compression scheme the channels were created in. A typical frame of uncompressed NTSC resolution is generally 720×480 pixels and for the purposes of description we use a 24-bit color RGB space (8bits per pixel per color), so each frame takes 1,036,800 bytes of memory. For the purposes of this explanation we also refer to the video as a single frame understanding that for motion this process reoccurs approximately 30 times a second depending on the Format and frame rate of the video used.

Once the disparate channels are reconstructed in memory each is scaled in the horizontal and vertical dimension. This is accomplished in one of two ways. The first is a standard bicubic, linear or nearest neighbor reverse interpolation to reduce the resolution. This technique produces the greatest image quality but also is processor intensive and may be prohibitive for some applications. Interpolation in this context is essentially the generating of a new pixel by the mathematical averaging of pixels adjacent in some way to it. The second technique is illustrated in FIG. 9 below.

Figure 9:
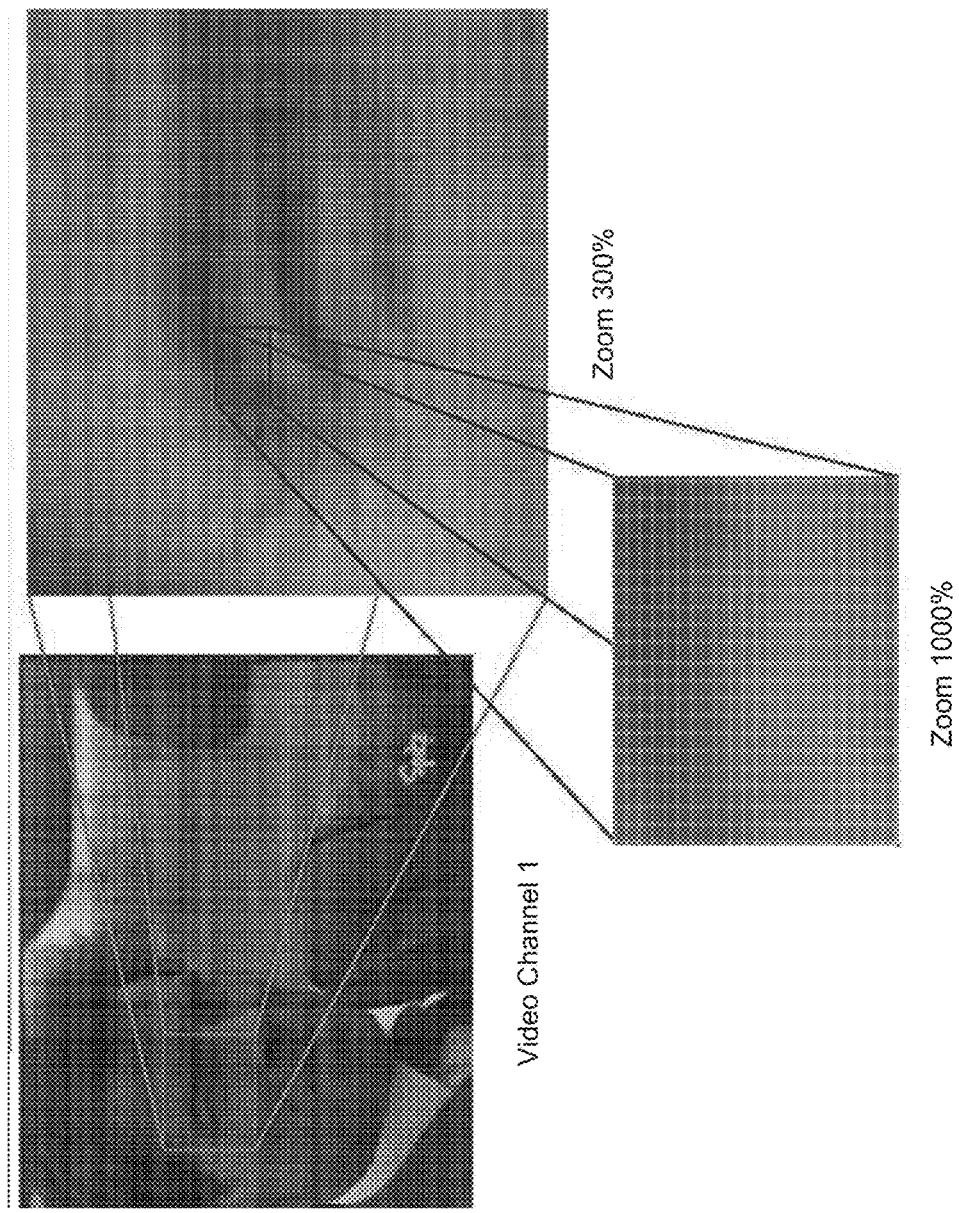
FIG. 9 illustrates the video scaling by omission technique used to generate a video grid.

FIG. 9 illustrates the video scaling by omission technique used to generate a video grid. This second technique is a less processor-intensive memory remap and copy. Referring to FIG. 9, in this illustration we have taken a grid and superimposed it on top of image 1 from FIG. 8. This grid is meant to represent the pixels that are in the Figure as magnified by 1000%. Here, each square of the video represents one pixel of this frame. The pixels then may be represented in memory in the fashion shown in FIG. 10, below.

Figure 10:
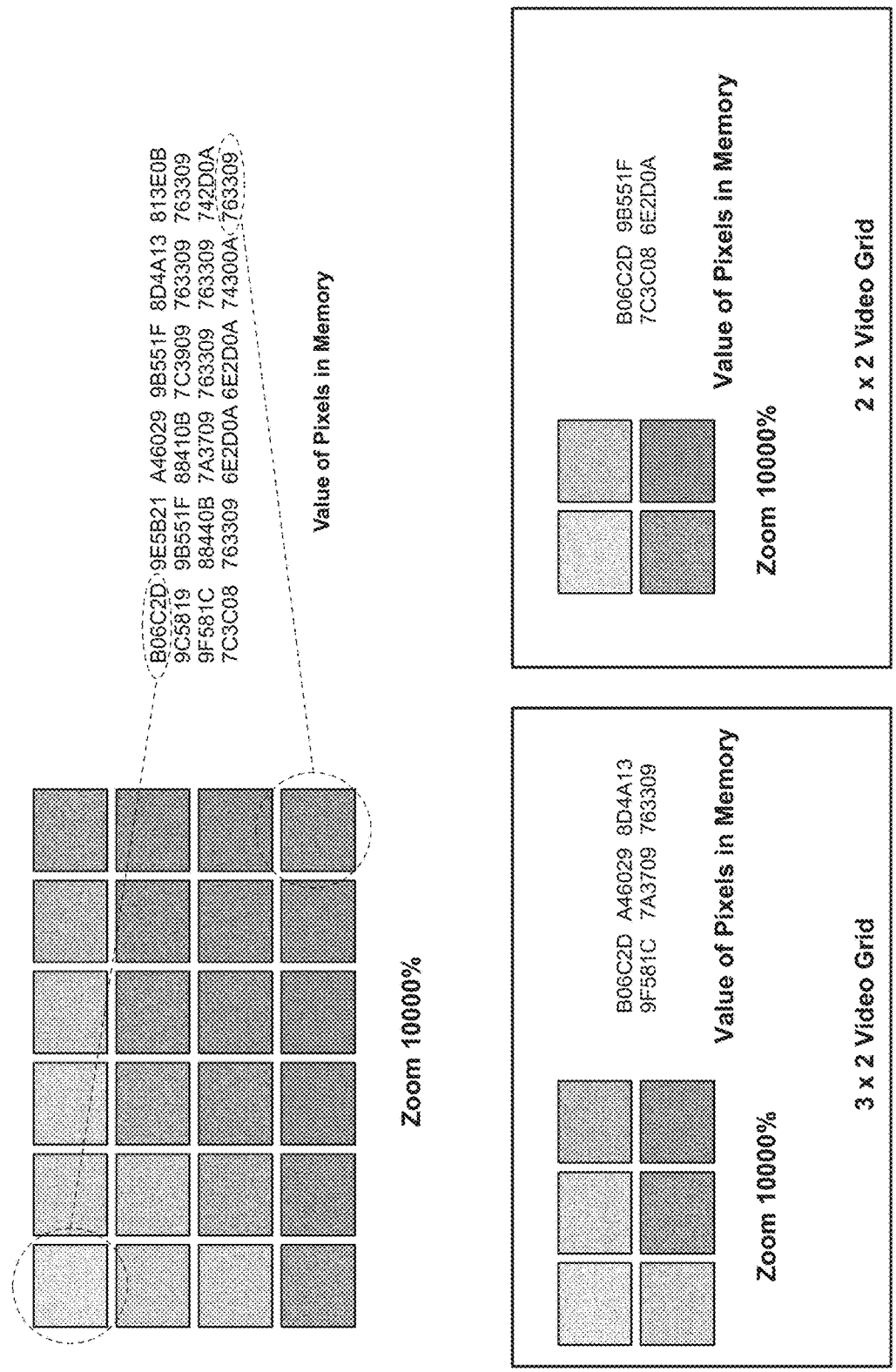
FIG. 10 shows a graphical implementation of the formula used in the video scaling by omission technique.

FIG. 10 shows a graphical implementation of the formula used in the video scaling by omission technique. The representation of memory is a hexadecimal encoding of the color information bits. The process described here is applied to the entire image but for illustration purposes only a small area of the image is discussed. One technique is governed by the following computer formula written loosely in the style of "C" as shown in Table 1.

TABLE 1

SCALING BY OMISSION CODE

```
size_of_image_horizontal / number_of_images_per_screen = image_width;
size_of_image_vertical / number_of_images_per_screen = image_height;
typedef pixelbuffer = byte[3];
pixelbuffer image1data = (raw pixels from image 1);
pixelbuffer image2data = (raw pixels from image 2);
pixelbuffer image3data = (raw pixels from image 3);
pixelbuffer image4data = (raw pixels from image 4);
pixelbuffer compositeImage = sizeof(image1data);
for (int i=0; i < image_height; i++)
{
int horizontal_counter=0;
for (int j=0; j< image_width; j+number_of_images_per_screen)
{
compositeImage[(i*size_of_image_horizontal)+horizontal_counter]
= image1data[(i*size_of_image_horizontal)+j];
horizontal_counter++;
}
for (int q=0; q< image_width; q+number_of_images_per_screen)
{
compositeImage[(i*size_of_image_horizontal)+horizontal_counter]
= image1data[(i*size_of_image_horizontal)+q];
horizontal_counter++;
}
```

TABLE 1-continued

SCALING BY OMISSION CODE

```
}
for (i=image_height; i < (image_height*number_of_images_per_screen); i++)
{
int horizontal_counter=0;
for (j=0; j< image_width; j+number_of_images_per_screen)
{
compositeImage[(i*size_of_image_horizontal)+horizontal_counter]
= image1data[(i*size_of_image_horizontal)+j];
horizontal_counter++;
}
for (q=0; q< image_width; q+number_of_images_per_screen)
{
compositeImage[(i*size_of_image_horizontal)+horizontal_counter]
= image1data[(i*size_of_image_horizontal)+q];
horizontal_counter++;
}
}
```

Essentially, the code shown in Table 1 derives a number based upon the horizontal and vertical size of the desired output Format and divides those dimensions by the number of images (assuming a matrix configuration). That derived number then determines the number of pixels to skip when progressing literally from the upper left to the lower right of the image going by horizontal rows of pixels. In other words if you have a 2×2 matrix of video channels you would skip every other pixel in both dimensions of the image in order to reduce the overall amount of video data by 75%. This new image data is then position adjusted to offset it to the specific part of the video field for the specific input channel. Similar reductions work for more numerous channels. For example a 3×3 matrix of channels would result in the skipping of every second and third pixel.

In the bottom of FIG. 10 one may see the graphical implementation of the above formula in both a 2×2 and a 3×2 video grid format. The advantage of this approach is that since the procedure is a simple memory copy or reference, the procedure occurs very quickly, thus reducing the processing loads. The math is limited as there is no complex averaging occurring on the video data. Rather the memory is simply copied from one location in memory to another.

Once the new image has been "assembled" in memory a Compression algorithm may be run to re-Compress the channel and distribute it on the Network. Some Compression algorithms will require that more than one frame be in memory at any given time to run the algorithm. This happens because the nature of the Compression references frames that have temporally occurred prior or post the frame being processed. Examples of this would be MPEG and ATSC (HDTV). To accomplish this, one may use the above approach and add a circular buffer so that many frames will be in memory at the same time. Then number of frames in the buffer is determined by the definitions in the Compression algorithm.

The second method of video processing and assembly that is available relies on video that has been Compressed using Macroblocking such as MPEG and ATSC. This approach uses processing on the independent Macroblocks in their raw Format prior to re-assembly. This gives approximately a 500% improvement in the efficiency of the rescaling of the image approach detailed above. To better understand this, an example of Macroblock Compression is presented in FIG. 11, below.

Figure 11:
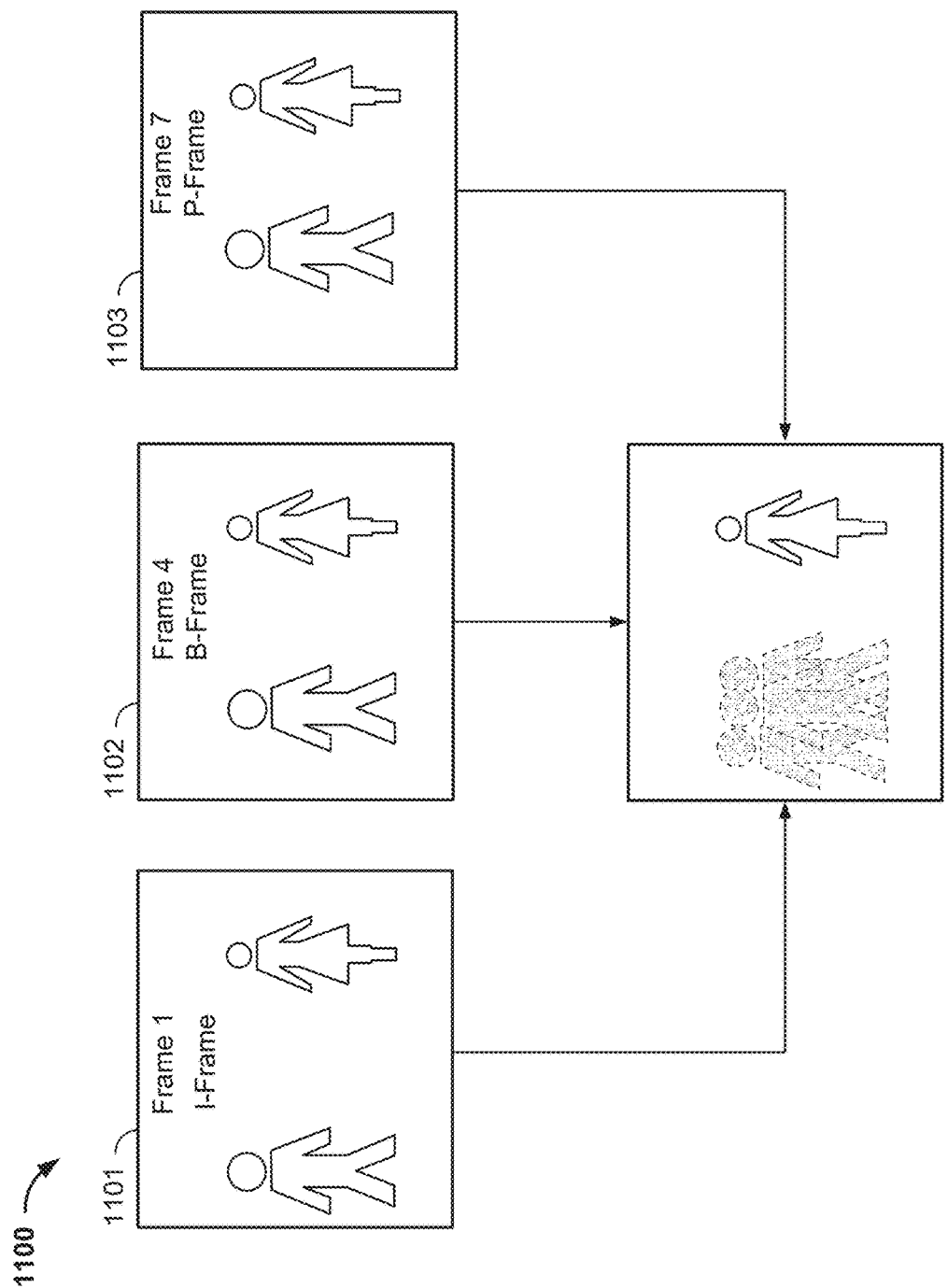
FIG. 11 shows an example of Macroblock Compression.

FIG. 11 shows an example of Macroblock Compression. FIG. 11 shows a series of 3 frames from a time index of 1 (naught) 1101, 4 (naught +3) 1102, and 7 (naught +6) 1103. Each of these frames 1101-1103 is representative of a different type of MPEG or ATSC frame. The first frame 1101 is an "I" frame. It is the entire image with all of its Macroblocks Compressed with a JPEG style Compression. The second frame 1102 is a "P" frame. The "P" frame is a predictive frame. It contains only the Macroblocks, which have substantially changed from the "I" frame it references. The third frame 1103 is a "B" frame. The "B" frame is a bi-directional frame. It looks forward and backward in the time stream to find the nearest Macroblock that matches each region of the screen. If a suitable frame may not be found within the temporal constraints of the Compression and buffering the system simply Compresses a new Macroblock and transmits it in the stream.

To illustrate this we have taken each of the frames and composited the images into a new frame, which is essentially a time lapse of the sequence. The areas of the picture that are black and white indicate areas of the screen that have not changed throughout the whole sequence, thus the Macroblocks describing that area of the screen are unaltered. Areas of the picture that are gray are the areas of interest in the frame or areas that need to be updated. Something in the Macroblock has changed.

The key thing to understand is that when the Macroblock is referenced after its instantiation, the algorithm is simply pointing to an area of memory known to contain this Macroblock. It is in this lookup process that an embodiment of our invention resides. Our approach is to scale the Macroblocks using the same techniques mentioned in the previous section. We then store the Compressed Macroblock at a new memory address. When a reference to the initial Macroblock arrives in the stream we redirect it to the new Macroblock location.

There is some spatial translation required as well. For example, if Macroblock 21 is normally located at 360 pixels in and 240 pixels down (roughly the middle of the screen) and we are decreasing the size of the image by 50% then the new location for Macroblock 21 is 180×120. The Macroblock itself is smaller by the same factor. This allows us to scale only the parts of the image that are original and benefit from the efficiency of the original Compression by a reduction in processing equal to the reduction in space of the original image. Typically high quality MPEG2 carries a 4 to 6 times efficiency in space reduction. All of the translation and frame structures in the original stream are executed through a simple memory lookup/modifications table that is static per any given VPG configuration.

Figure 12:
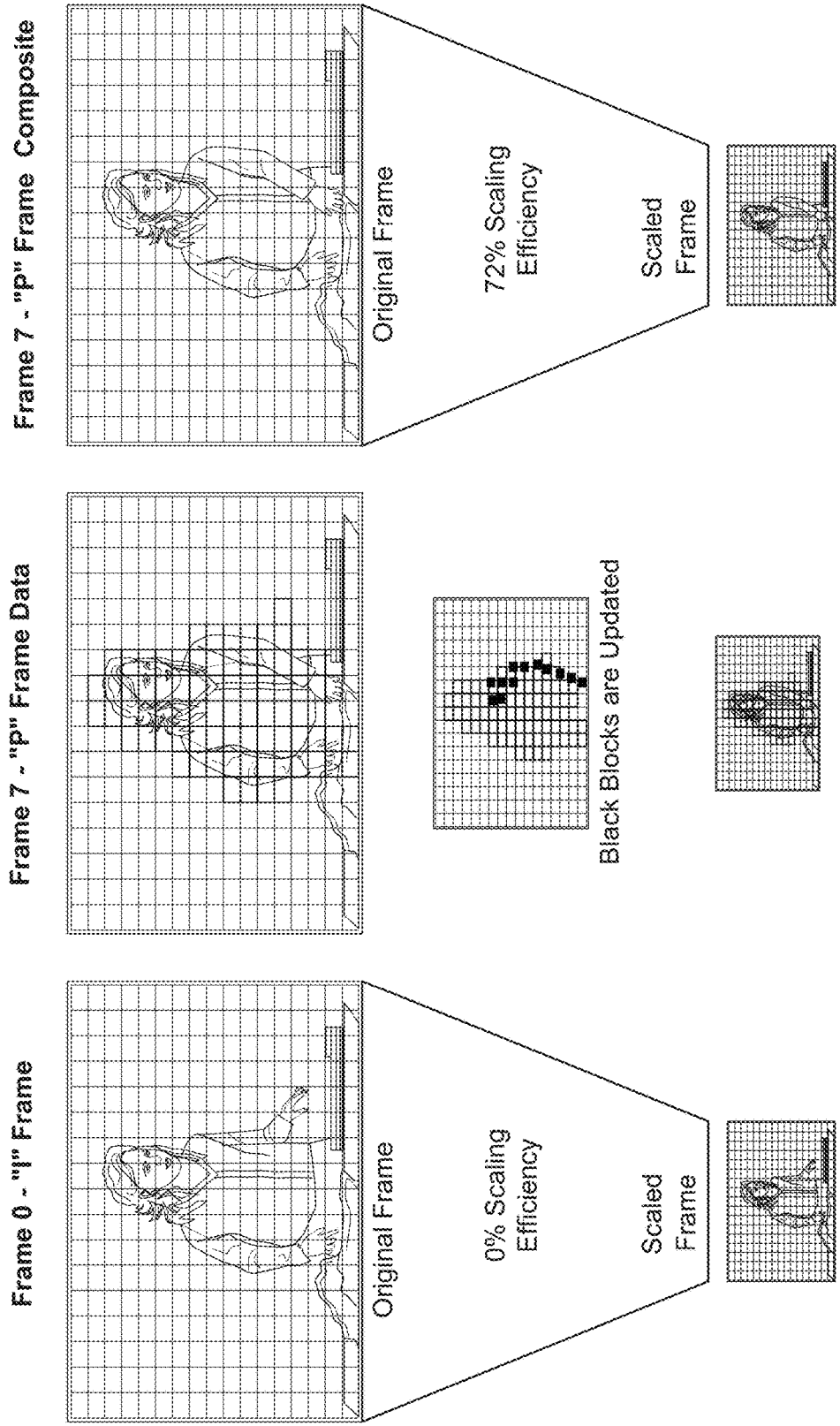
FIG. 12 is an illustration of video scaling using the Macroblock preprocessing technique.

FIG. 12 is an illustration of video scaling using the Macroblock preprocessing technique. This technique results in a substantial savings in processing power. Once the stream is assembled in this way a Compression algorithm creates the new stream from the virtual (i.e. existing only in memory) screen. This process is detailed in FIG. 12. As you may see in this example we achieve 72% efficiency in generating the scaled "P" frame versus if we simply reassembled the frame and then scaled it. In this sample the average efficiency in the intermediate "B" frames is 92%. It is important to note the formula that determines the processing power required or rather the efficiency of this technique is as follows in EQUATION 1:

$$\frac{\text{Size of Orginial image in memory}}{\text{Size of Compressed image in memory}} * \text{Processing required to scale the video a complete frame at a time} = \text{Processing required in this technique} \quad \text{EQUATION 1}$$

In some VPG configurations such as the one detailed in FIG. 6 there is a background graphic that is present. This graphic may be generated using various methodologies and then loaded as the "background" for the memory that holds the frames. There is no difference in the graphics memory or the video memory once they have both been reduced to an uncompressed binary stream. This allows very dynamic composites of data from a myriad of sources to be integrated with the video. This technique is detailed in FIG. 13, below. You may see in the drawing that the scaled video that would be derived from one of the techniques detailed above is simply grafted over the memory allocated to buffer the video frame. While this example is a pseudo-static still image as a background, a full motion video backdrop may also be constructed by simply making sure that a full frame video is copied into the memory buffer in the same way a still image is prior to memory compositing/overlaying.

Figure 13:
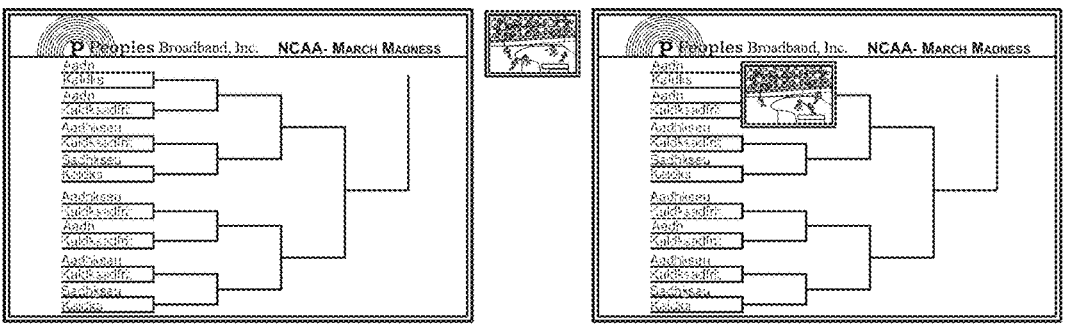
FIG. 13 is a demonstration of the integration of the Macroblock preprocessing technique with on screen graphics.
Figure 14:
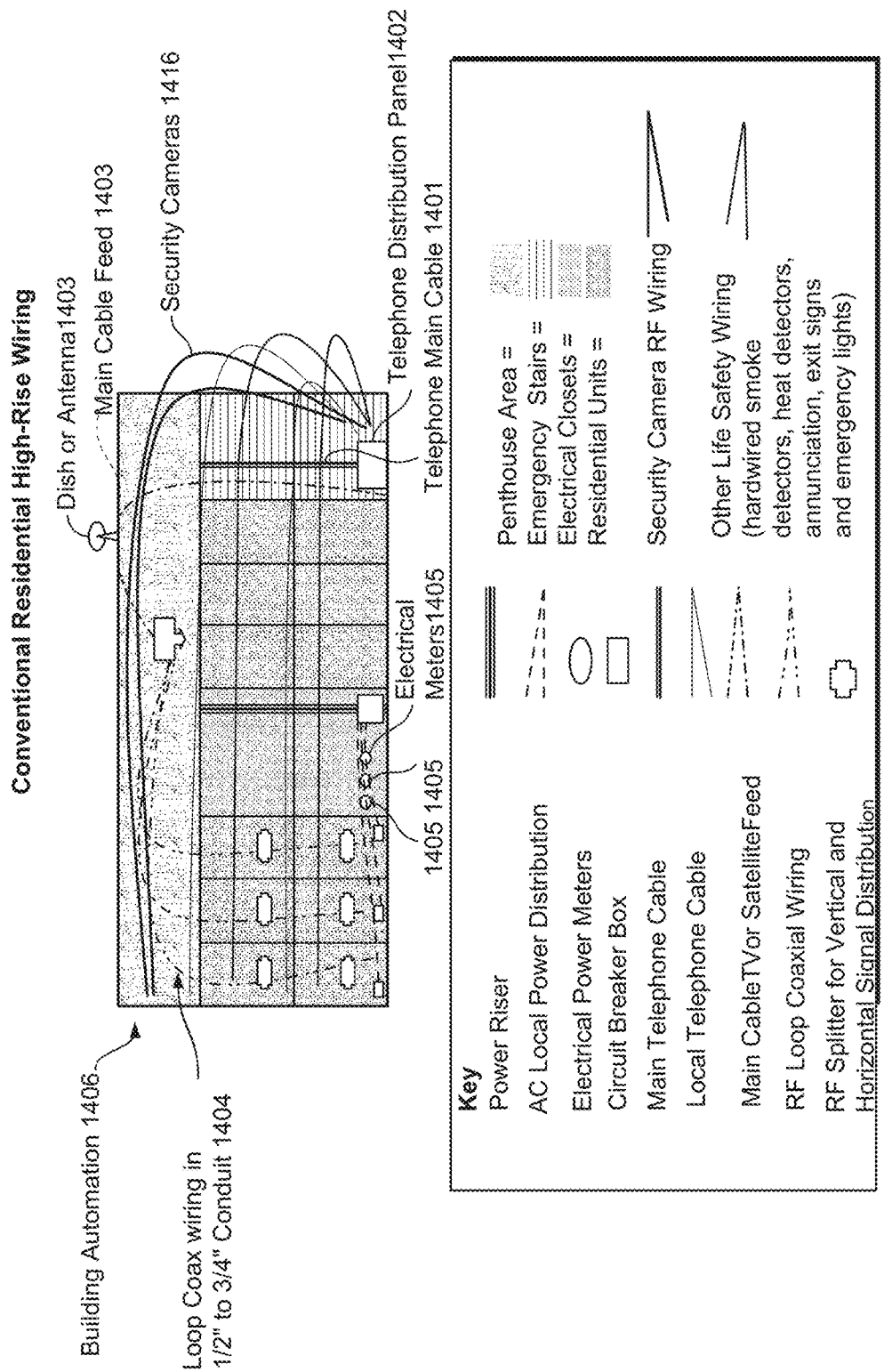
FIG. 14 illustrates several systems associated with traditional risers in a MDU.

FIG. 13 is a demonstration of the integration of the Macroblock preprocessing technique with on screen graphics. For some implementations of the VPG, the VPG has discrete audio streams on their own transport stream available for "tuning" on the client side. This is accomplished by de-multiplexing or otherwise tuning the audio from the original stream, tagging it with timing information to keep it in sync with the video stream and then re-streaming it out when the video has been assembled and is ready for transport. While frame accurate timing may not be possible as the video and the audio may be in separate transport streams, acceptable accuracy is maintainable by buffer management on both the server and the client (STB).

The determination of which sources should be composited utilizing the methods described in detail in the above section may not be pre-determined. For example, utilizing data from a database or other information source to "select" which channels are composted. In the scenario where Metadata is available for the streams, the VPG may be constructed on the basis of a search of said Metadata. For example, if all the streams in the system include genre information VPG screens may automatically be constructed to aggregate on that basis. For example, a major broadcast network has many different types of content. At 6:00 p.m. they have on their evening news but then at 7:00 p.m. a basketball game starts. The "News" VPG would have that channel listed at 6:00 p.m. but it would not have it at 7:00 p.m. because that channel will have "moved" (or more accurately been discontinued and engaged elsewhere) to the "Sports" VPG. The overall effect is that users will have the ability to "browse by content". Any other aspect of Metadata may be used as context for the creation of a new VPG screen. An individual users' Metadata may also be used to develop a context for a new VPG. Groupings may be created by Metadata from but are not limited to the program, user, location and channel.

We now turn to a discussion of an additional aspect of the present telecommunications system. Specifically, a communications/electrical distribution system that minimizes space requirements for electrical and communication closets in new construction and permits the deployment of communications and electrical upgrades in older buildings by deploying an integrated Ethernet communication network for communications and electrical distribution functions.

Figure 15:
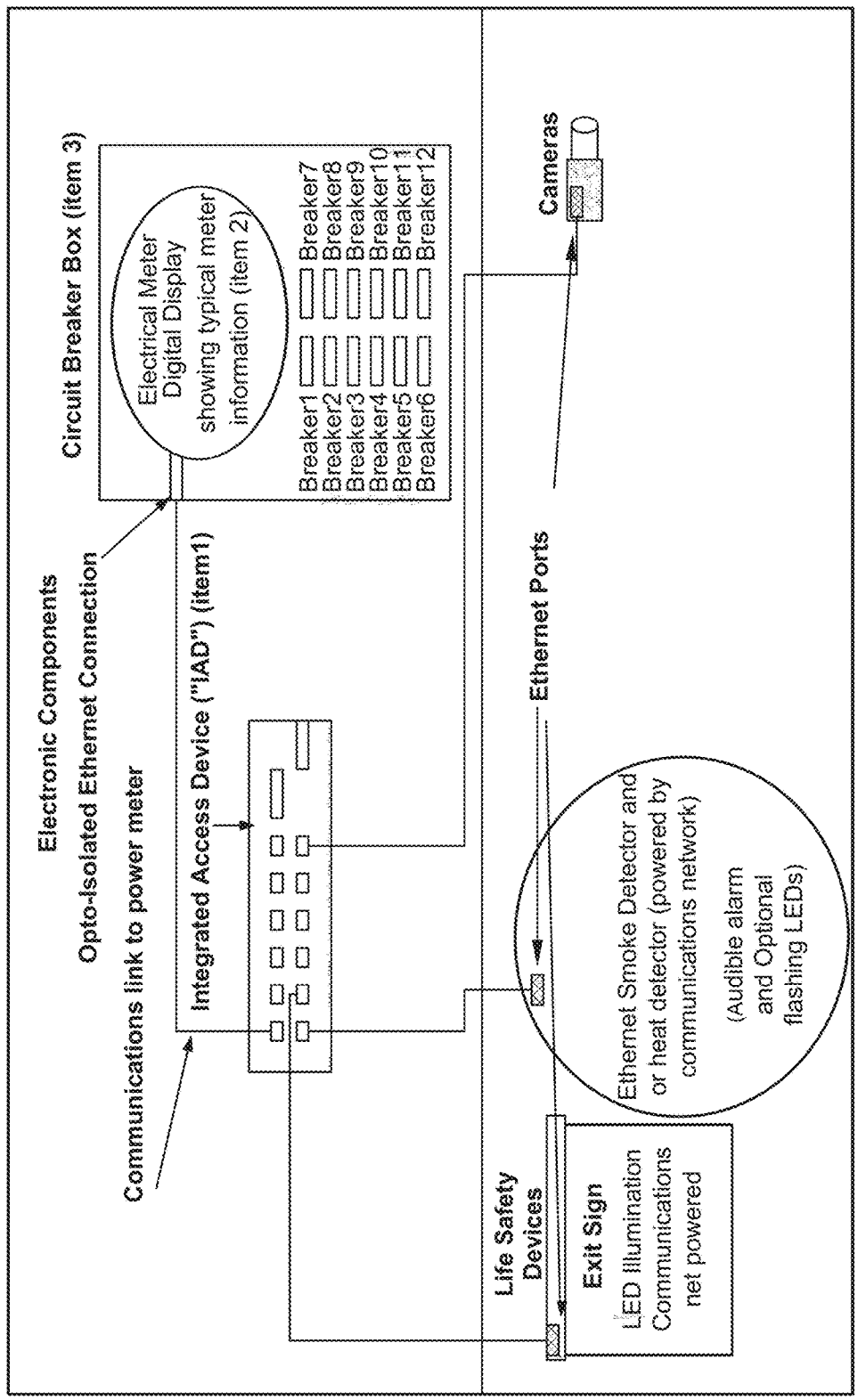
FIG. 15 illustrates several electronic components of the communications/electrical distribution system.
Figure 16:
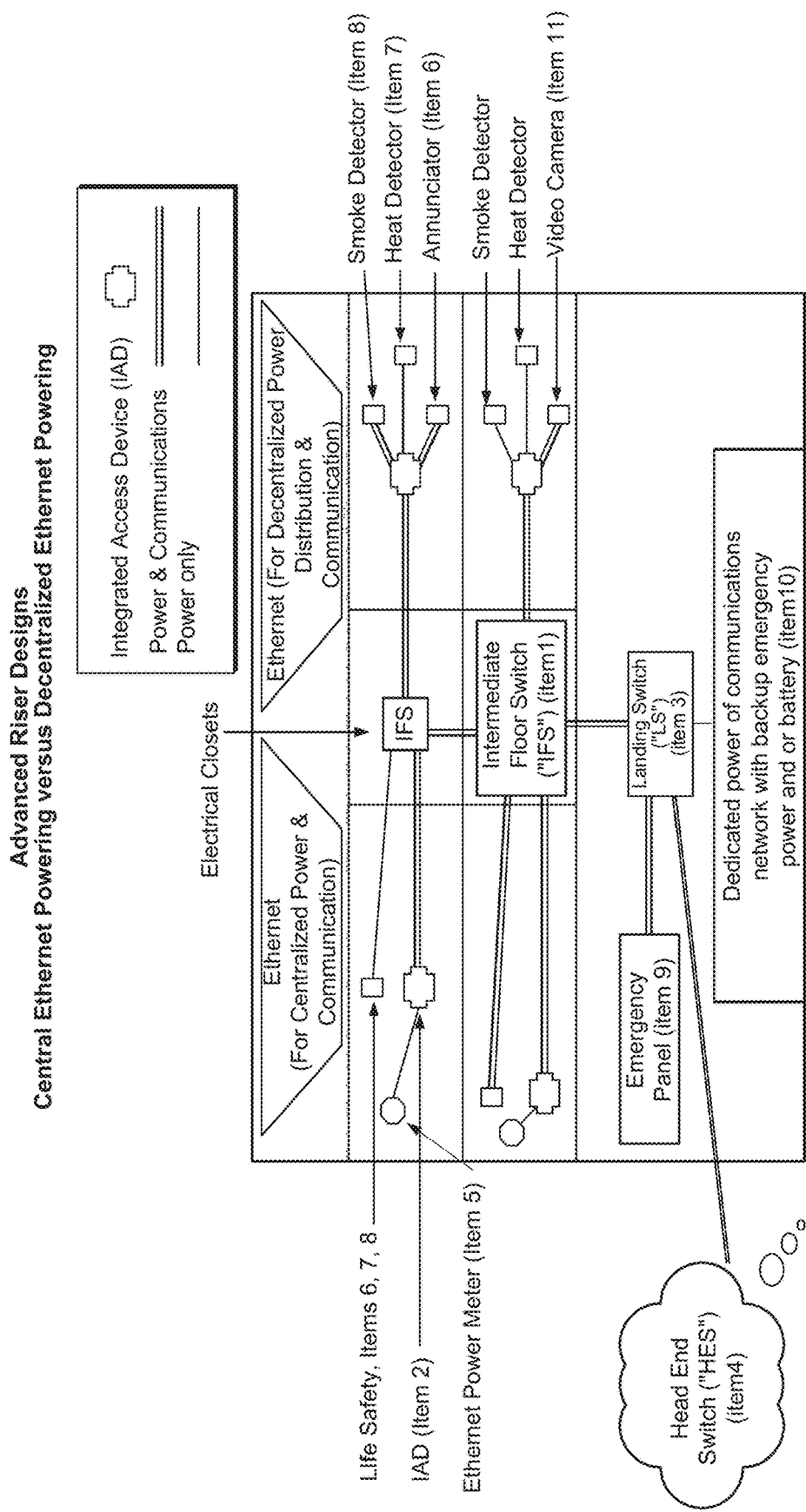
FIG. 16 illustrates an advanced riser design showing centralized Ethernet powering and decentralized Ethernet powering.

The communications/electrical distribution system is set forth in FIG. 15-20. The following definitions are helpful with regard with regard to the elements shown in FIGS. 15-20. FIG. 15 illustrates several electronic components of the communications/electrical distribution system. FIG. 16 illustrates an advanced riser design showing centralized Ethernet powering and decentralized Ethernet powering.

Integrated Access Device ("IAD")

An Ethernet switch located in or proximate to residential units. The IAD preferably includes the following elements, as illustrated in FIG. 15.

1) Multiple Ethernet ports, copper, fiber or both, and associated electronics circuitry to support Ethernet communications standards.

2) Circuitry and connectors to receive power over network wiring to power the IAD or to receive power from a dedicated power distribution system for the communications network.

3) Circuitry and connectors to power external communication and non-communication devices.

4) All circuitry for sending and receiving power will be scaled to the projected electrical loads required to power communications equipment including Voice-Over Internet Protocol (VoIP") Telephones and non-communications devices such as life safety equipment.

5) Circuitry and connectors for the bidirectional transcription of analog to Voice-Over Internet Protocol (VoIP") telephone calls and to provide power to analog telephones.

6) The IAD may also include circuitry to disable ports automatically or by remote command accordance with a life-safety priority scheme.

Intermediate Floor Switch ("IFS")

As illustrated in FIG. 16, for example, the IFS is preferably an Ethernet switch located on each floor to route communications from and to IADs located in units to a Landing Switch. The IFS preferably includes the following elements:

1) Multiple Ethernet ports, copper, fiber or both, and associated electronics circuitry to support Ethernet communications standards.

2) Circuitry and connectors to receive power over network wiring to power the IFS or to receive power from a dedicated power distribution system for the communications network.

3) Circuitry and connectors to power external communication and non-communication devices including IADs.

4) All circuitry for sending and receiving power will be scaled to the projected electrical loads required to power communications equipment including IADs and non-communications devices such as life safety equipment.

5) Circuitry and connectors for the bidirectional transcription of analog to Voice-Over Internet Protocol (VoIP") telephone calls and powered speakers to provide fire annunciation systems.

6) Where IADs are not used, the IFS may also include circuitry and connectors for the bidirectional transcription of analog to Voice-Over Internet Protocol (VoIP") telephone calls and to provide power to analog telephones in units.

Landing Switch ("LS")

As illustrated in FIG. 16, for example, the LS is preferably an Ethernet switch located within the building's demarcation area to route communications from a head-end switch to IFSs and IADs. The LS preferably includes the following elements:

1) Multiple Ethernet ports, copper, fiber or both, and associated electronics circuitry to support Ethernet communications standards.

2) Circuitry and connectors to receive power from a dedicated power distribution system for the communications network.

3) Circuitry and connectors to power external communication and non-communication devices including IFS and IADs if IFSs are not used.

4) All circuitry for sending and receiving power will be scaled to the projected electrical loads required to power communications equipment including IADs and non-communications devices such as life safety equipment.

Head-End Switch ("HES")

As illustrated in FIG. 16, for example, the HES is preferably an Ethernet switch located at the head-end or intermediate geographical areas ("Net Pops") to route communications from peripheral network elements that handle telephone service, digital video, high-speed Internet access and other communications services, all using Internet Protocol, to other HESs, LSs, IFSs and IADs comprising the network Communications Network The interconnection of HES, LS, IFS and IAD's to permit the distribution of voice, video and data services over an IP network including physical layers such as Ethernet, SONET, DSL and ATM.

Ethernet Power Meter

As illustrated in FIGS. 15 and 16, for example, the Ethernet power meter is preferably an electrical power meter comprised of circuitry to monitor electrical consumption, wave form and other data and an Ethernet interface permitting bidirectional communications over an Ethernet network to permit electrical usage data and other information to be downloaded. The Ethernet Power Meter may be mounted or integrated in the Circuit Breaker Box.

Circuit Breaker Box

As illustrated in FIGS. 15 and 16, for example, the Circuit breaker box is preferably a conventional a/c circuit breaker box containing manual circuit breakers. The circuit breaker box is connected to the Ethernet Power Meter. The circuit breaker box may also incorporate the following elements:

1) Digital relays ("circuit breakers") that may be tripped and reset either locally via a soft data switch or remotely via commands sent over the Ethernet network.

2) Memory and software enabling the Circuit Breaker Box to be controlled by the utility in accordance with a power prioritization scheme so that communication and life-safety systems are maintained in the event of a power failure and so that other systems such as refrigerators and limited lighting is maintained in the event of a brown-out.

Fire Annunciator

As illustrated in FIGS. 16, for example, the fire annunciator is preferably system whereby a speaker is connected using wires or cables to the VoIP circuitry located in the IAD to allow police and fire personnel to communicate with residents. Additionally, a microphone may be incorporated and connected to the VoIP circuitry via wires or cable to conduct bidirectional communications with each unit.

Hard-Wired Smoke Detector

As illustrated in FIGS. 16, for example, the hard wired smoke detector is preferably a conventional smoke detector with a connector and electronics that draws power from the communications network to operate and may comply with the power over Ethernet (POE) standard. The Hard-Wired Smoke detector will connect to the IAD, IFS or LS to draw power. Ethernet communications circuitry may be incorporated into hard-wire smoke detector, although it is not required, to communicate alarm conditions and other status information over the network to a monitoring area.

Hard-Wired Heat Detector

As illustrated in FIGS. 16, for example, the hard wired heat detector is preferably a conventional heat detector with a connector and electronics that draws power from the communications network to operate and may comply with the POE Standard. The hard-wired heat detector will connect to an IAD, IFS or LS to draw power. Ethernet communications circuitry may be incorporated into a Hard-Wired Heat detector to communicate alarms and other status information over the network to a monitoring area.

Emergency Exit Signs & Other Life Safety Devices

A conventional Emergency Exit Sign with a connector and electronics that draws power from the communications network to operate and may comply with the POE standard. The hard-wired Emergency Exit Sign will connect to an IAD, IFS or LS to draw power. Versions of the Emergency Exit Sign may also incorporate other Life Safety devices. Ethernet communications circuitry may be incorporated into Emergency Exit Signs and Other Life Safety Devices to report alarms and status information over the network to a monitoring area.

E-911 Database

A central database containing unit numbers, port locations in units, MAC addresses and other information. In the event of a E-911 call, software will immediately identify the address, unit number and room location of the call.

Emergency Panel

As illustrated in FIGS. 16, for example, the emergency panel is preferably an emergency panel located where required by local ordinance that will provide either hard alarm information or computer displays showing alarms. The panel will also contain a fireman's telephone interface permitting fire personnel to access the functions of the fire annunciation system and check smoke detector and heat detector status in buildings in which devices with these features are installed. Software is provided for the Emergency Panel system that will allow fire personnel to utilize the annunciation system to access the entire building, groups for floors, individual floors and or groups of individual units. Additionally, the Emergency Panel receives data from the Central UPS and contain power management software to communicate with and control the circuit breaker boxes which incorporate digital relays.

Life Safety

Life Safety may include one or more of the following: fire annunciations, hard-wired smoke detectors, hard-wired heat detectors, hard wired monoxide detectors, hard-wired water sensors, hard-wired security systems including wired and wireless sensors, Exit Signs, E-911 Database, Emergency Panel, medical patient monitoring devices, gas detectors or other environmental detectors designed to protect people or property by sounding an alarm and or by communicating over a communications network.

Central UPS

As illustrated in FIGS. 16, for example, the Central UPS is preferably a central Uninterruptable Power Source (UPS) or battery for the building that will directly power all equipment on the Ethernet network. The UPS will receive power via the AC power grid and or emergency generator if required. The Central UPS will contain circuitry to detect and report over the Ethernet network any power failures, brownouts or other conditions requiring the reconfiguration of power use in the building.

IP Video Cameras

As illustrated in FIGS. 16, for example, the IP video camera is preferably a video camera with integrated encoders with an Ethernet interface or a standard video camera connected to an encoder with an Ethernet interface.

Ethernet Wiring

For the purpose of simplification, Ethernet Wiring refers to any data wiring currently used for or that may be developed for Ethernet. Cat-3, Cat-5, Cat-5e and Cat-6 copper wiring and single mode and multi-mode fiber-optic wiring are examples of Ethernet Wiring. Similarly, diagrams that refer to Cat-5 wiring may also include all other forms of Ethernet wiring as defined herein.

Retrofit of Existing Buildings

There are three communications system permutations for retrofitting existing buildings with advanced communications to reconfigure riser usage. Each permutation is discussed below with regard to one of FIGS. 17-19.

Figure 17:
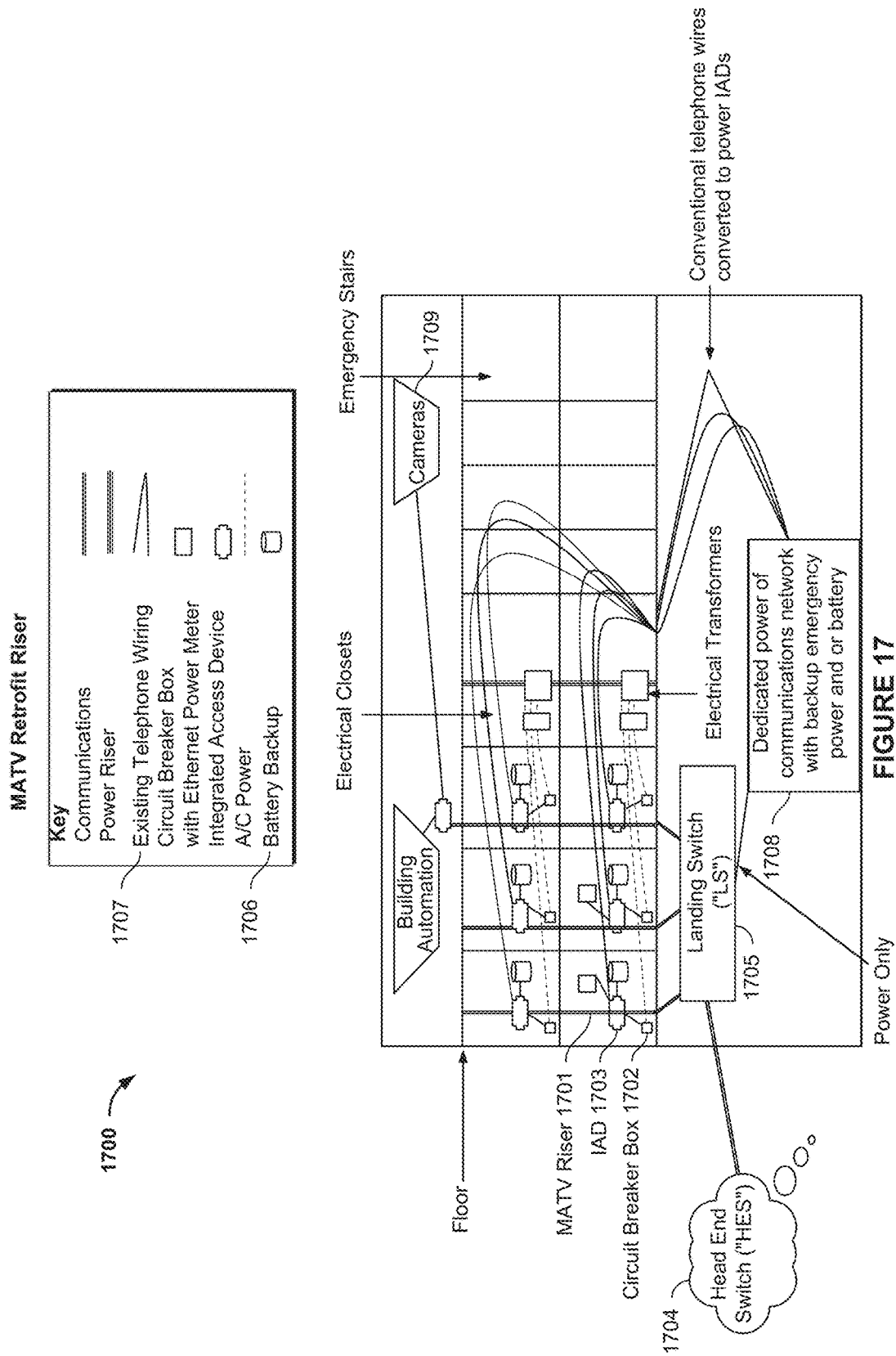
FIG. 17 illustrates a MATV riser deployed network.

FIG. 17 illustrates a MATV riser deployed network 1700. As shown in FIG. 17, all coaxial cable is removed from the MATV riser/conduit 1701 and fiber-optics is home run to each unit being served by the riser/conduit. The MATV riser fiber-optics entering a unit is cross connected to the in-unit circuit breaker panel 1702 by collocating the fiber in the common a/c electrical conduit with a/c electrical wiring. The IAD 1703 is located next to or proximate to the existing circuit breaker panel and fiber-optic connections are run to a/c electrical outlets from the IAD using the existing a/c electrical conduit to provide communications within the unit.

In this deployment, the network includes the HES 1704, LS 1705 and IAD. The IAD may be powered via common AC power protected by a battery backup 1706 located in the unit. Alternatively, one pair of existing telephone wires 1707 may be reused to provide power to the IAD from a dedicated network communications power source 1708. An IAD may also be located in the Penthouse to transmit IP Video camera feeds 1709 and interface building automation equipment to the network. Ethernet power meters located in or next to the circuit breaker box 1702, hard-wired smoke detectors, hard-wired heat detectors, fire annunciators and other Life Safety devices may be attached to the IAD to draw power from the communications network to operate and to communicate if necessary. Existing electrical service in the unit is interfaced to the circuit breaker box and the Ethernet power meter. The Ethernet power meter is read via the Ethernet network. The old electrical meters in the electrical closet are removed and replaced with small analog circuit breakers to permit the complete shut-off of power to a unit in an emergency. By removing the power meters from the electrical closets, new electrical service may be run into existing closets to upgrade service.

Benefits Where A Battery Backup Is Used

Where the IAD is powered via AC and battery backup, the old public telephone riser, house phone riser and coaxial cable wiring for video cameras may be removed. Emergency power may be redeployed in the old risers and vacated risers may be reserved for future use. Life-safety, emergency power, electrical service upgrades and power management capabilities may be deployed on the network together with advanced voice, video and data service without the need to create new risers. While the extent and scope of services in the building increases, the amount of physical wiring is reduced.

Benefits Where Power Over Old Telephone Wiring is Used

Where the IAD is powered via the old telephone wiring, all of the benefits listed above remain except that the telephone riser may not be reused.

Figure 18:
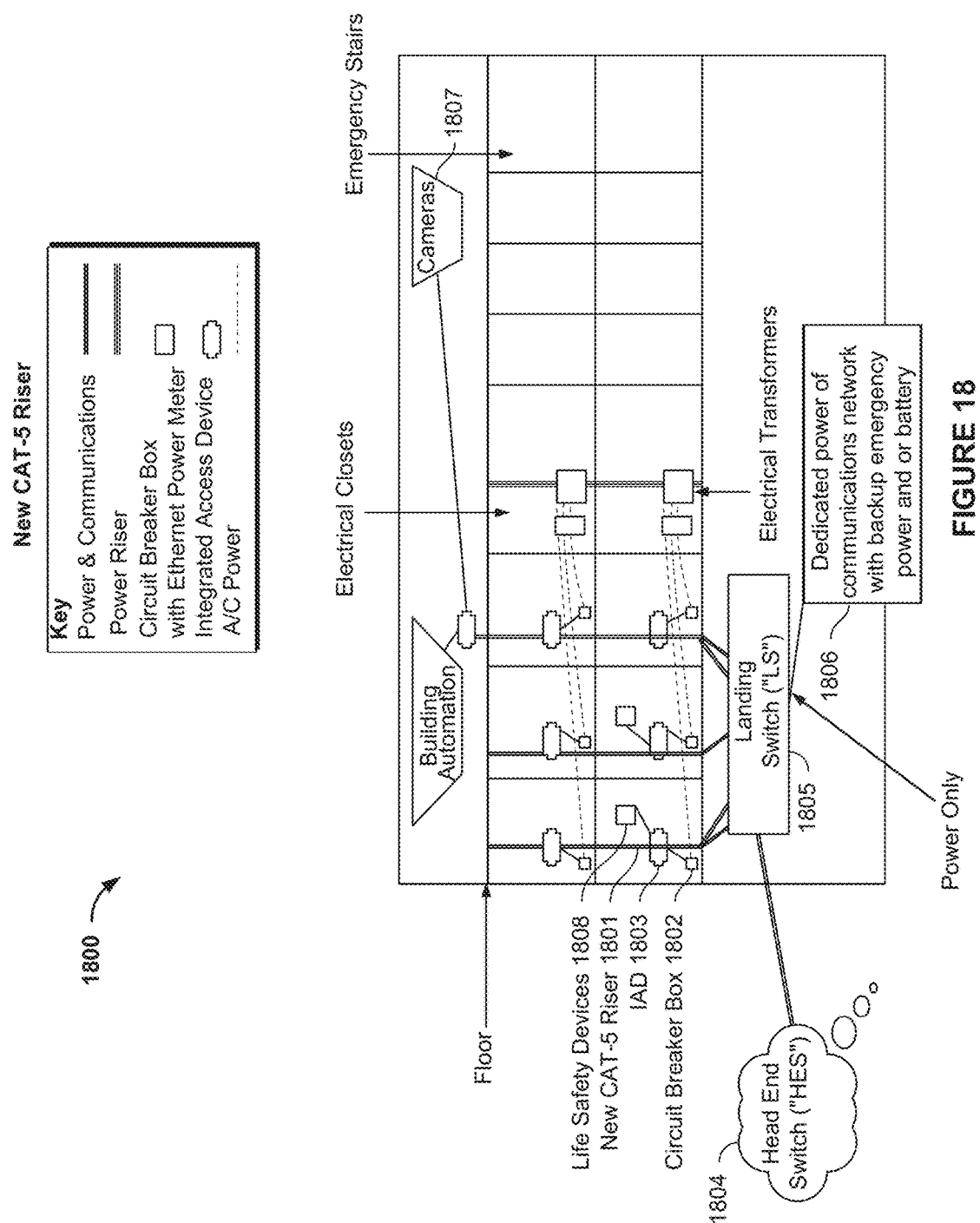
FIG. 18 illustrates a new CAT-5 deployed vertical riser.

FIG. 18 illustrates a new CAT-5 deployed vertical riser 1800. As illustrated in FIG. 18, new vertical risers running through each unit are constructed and home-run Cat-5 is deployed to bring power and communications to each unit to serve each unit 1801. The Cat-5 cable is brought next to the existing circuit breaker box 1802 via external mounting or mounting under baseboard and is connected to the IAD 1803. In this deployment, the network includes of the HES 1804, LS 1805 and IAD.

The LS and IAD switch are powered over the network using the Cat-5 cable via a dedicated network power source 1806. An IAD may also be located in the Penthouse to transmit IP Video camera feeds 1807 and interface building automation equipment to the network. Life safety devices may be attached to the IADs to draw power and communicate over the network if required 1808. Existing electrical service in the unit is interfaced to the new digital circuit breaker box and or Ethernet power meter. The Ethernet power meter is read via the Ethernet network. The old electrical meters in the electrical closet are removed and replaced with small analog circuit breakers to permit the complete shut-off of power to a unit in an emergency. By removing the power meters from the electrical closets, new electrical service may be run into existing closets to upgrade service.

Benefits of Vertical Deployed Cat-5 Riser

Although there is minimal construction, the complexity of feeding fiber through MATV risers is eliminated. Additionally, the IAD is powered via the network. The old public telephone riser, house phone riser and coaxial cable wiring for video cameras, and MATV coaxial may be reused. Emergency power may be redeployed in the old risers and other vacated risers may be reserved for future needs. Life-safety, emergency power, electrical service upgrades and power management may be deployed together with advanced voice, video and data service. While the extent and scope of services in the building increases, the amount of physical wiring is reduced.

Figure 19:
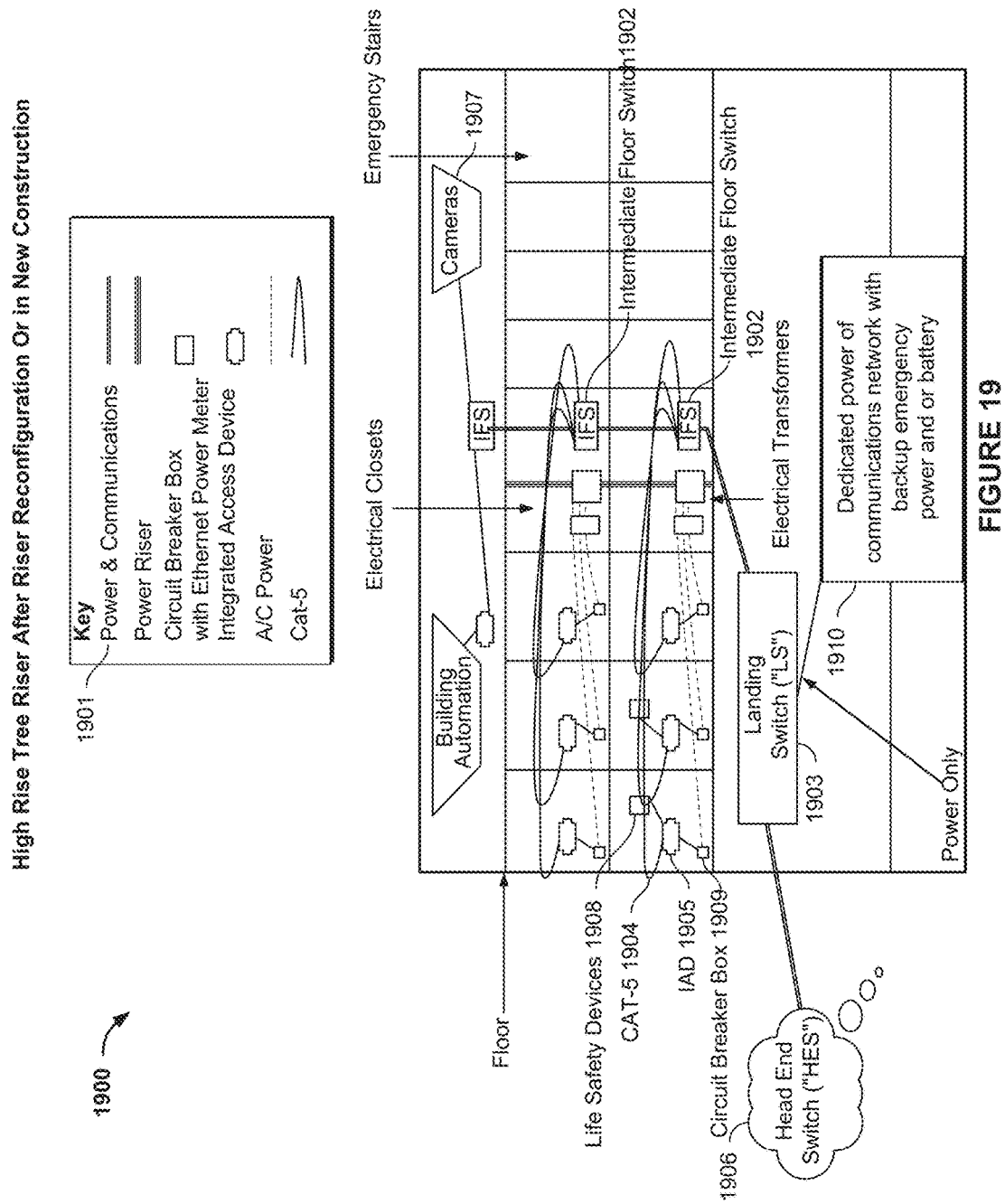
FIG. 19 illustrates a reconfigured public telephone or house phone deployed vertical riser with new horizontal riser to the unit.

FIG. 19 illustrates a reconfigured public telephone or house phone deployed vertical riser with new horizontal riser to the unit 1900. As illustrated in FIG. 19, public telephone wiring or house phone wiring is removed from vertical risers located in telephone distribution areas located on each floor 1901. Alternatively, sufficient new risers are created in a centralized location and covered using architectural facade where necessary 1901. Fiber-optic cable is brought to each floor together with Cat-5 wiring to provide power and communications to the IFSs 1902. IFSs 1902 are connected to each other and to the LS 1903 to create a ring topology with fail over capabilities.

Home-run Cat-5 cable is brought to each unit via horizontal hard conduit runs 1904 on each floor. The Cat-5 is brought next to or proximate to the circuit breaker box and is connected to the IAD 1905. In this deployment, the network includes of the HES 1906, LS 1907, IFS 1902, and IAD 1905. The IFS and IAD switches are powered over the network or via a dedicated communications power source 1910.

An IAD may also be located in the Penthouse to transmit IP video camera feeds 1907 and interface building automation equipment to the network. Life safety devices may be attached to the IAD 1908 to draw power from the network to operate and to communicate if necessary. Existing electrical service in the unit is interfaced to the new digital circuit breaker box and or Ethernet power meter 1909. The Ethernet power meter is read via the Ethernet network. The old electrical meters in the electrical closet are removed and replaced with small analog circuit breakers to permit the complete shut-off of power to a unit in an emergency. By removing the power meters from the electrical closets, new electrical service may be run into existing closets to upgrade service.

Benefits

Although there is minimal construction, all elements of the network are powered and may be used to power non-communication devices that might otherwise require dedicated wiring and lengthy wiring runs. The old public telephone riser or house phone riser, the coaxial cable wiring for video cameras and MATV coaxial may be removed. Emergency power may be redeployed in the old risers and other vacated risers may be reserved for future needs. Life-safety, emergency power, electrical service upgrades and power management capabilities may be deployed together with advanced voice, video and data services.

Space Efficient Riser Design For New Construction Buildings

The above riser designs have been discussed in the context of retro-fitting existing riser designs. The above riser designs can also in new construction and yield the same benefits. Additionally, there are three riser permutations of the above designs for new construction that yield significant space and wiring savings, as further discussed below.

Integrated Vertical Fiber-Optic Electrical Riser

Figure 20:
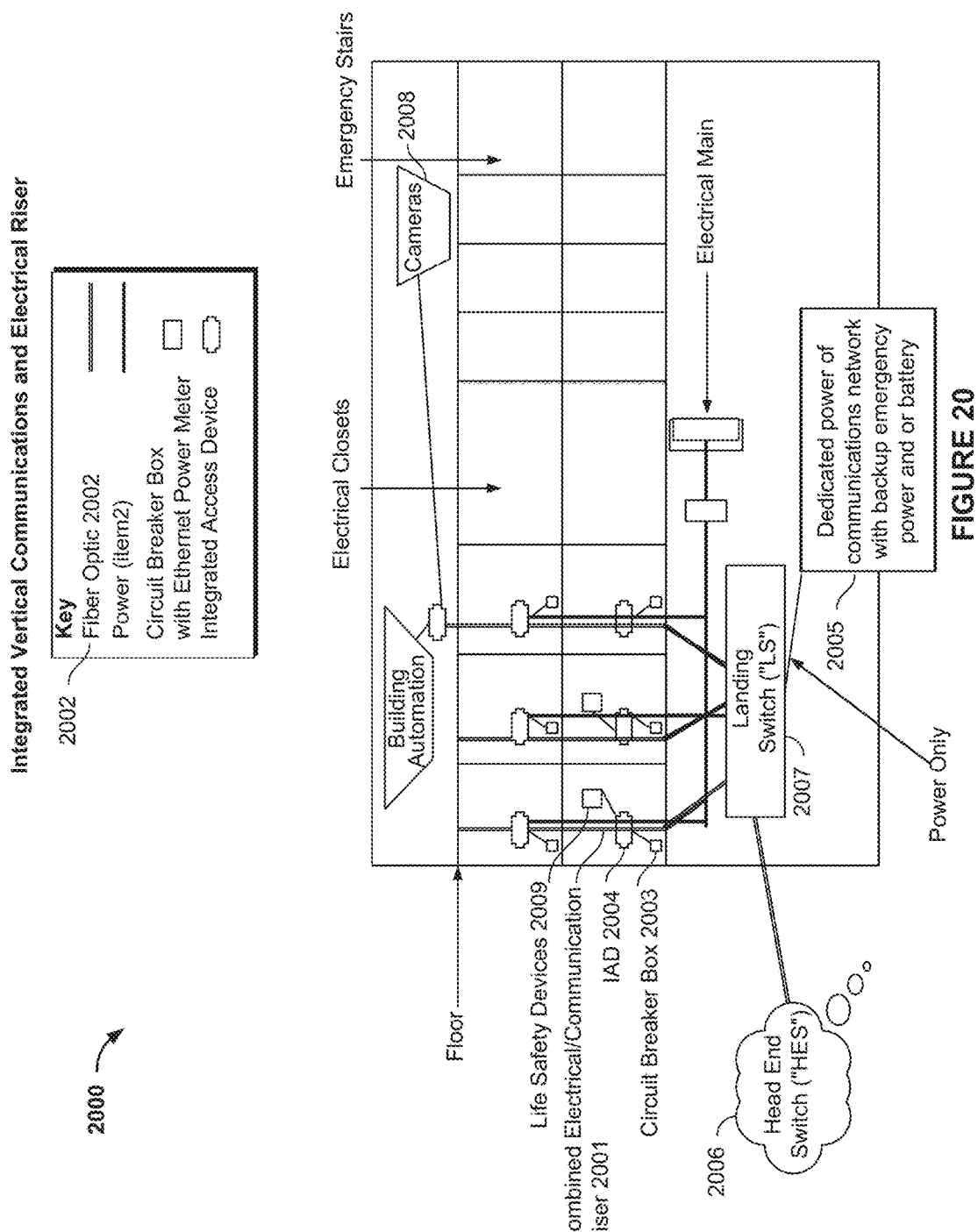
FIG. 20 illustrates an integrated vertical communications and electrical riser.

FIG. 20 illustrates an integrated vertical communications and electrical riser 2000. Where building heights permit the vertical distribution of AC without significant line losses requiring a power bus and transformers, a single home-run hard conduit is brought to each unit. Within the riser, a power cable 2001 is collocated with fiber optics 2002. The power cable and fiber optics are brought to the circuit breaker box which incorporates and Ethernet power meter 2003. The Ethernet Power meter is connected to the IAD 2004 and power usage is read over the network. A transformer is provided to convert AC to DC to power the IAD. The AC power supply for the building is tied into a UPS and emergency generator, if needed 2005. In this deployment, the network includes of the HES 2006, LS 2007, and IAD 2004. The LS and IAD switch are powered centrally. An IAD may also be located in the Penthouse to transmit IP video camera feeds (2008) and interface building automation equipment to the network. Life safety devices 2009 are connected to the IADs to draw power from the network to operate and can communicate over the network if communications is required.

Benefits

This design allows all advanced communication, life safety, electrical power and power management to be deployed while eliminating the need for communications and electrical closets to support units. The space saving allows developers to maximize rentable or salable square footage while eliminating the cost of installing additional risers and wiring Integrated Vertical & Horizontal IP Riser With Fiber & Cat-5 Wiring The design set forth in FIG. 19 entitled "High-Rise Tree Riser After Riser Reconfiguration or in New Construction" and described above may be used in the construction of new risers for high-rise buildings. Fiber-optic cable is brought to each floor together with Cat-5 wiring to provide power and communications to the IFSs 1901. IFSs 1902 are connected to each other and to the LS 1903 to create a ring topology with fail over capabilities. Home-run Cat-5 cable is brought to each unit via horizontal hard conduit runs 1904 on each floor. The Cat-5 is brought next to or proximate to the circuit breaker box and is connected to the IAD 1905. In this deployment, the network includes of the HES 1906, LS 1903, IFS 1902, and IAD 1905. The IFS and IAD switches are powered over the network or via a dedicated communications power source. An IAD may also be located in the Penthouse to transmit IP video camera feeds 1907 and interface building automation equipment to the network. Life safety devices may be attached to the IAD 1908. Electrical service in each unit is interfaced to the new digital circuit breaker box 1909.

Integrated Vertical & Horizontal IP Riser With Cat-5 Wiring

The design set forth in FIG. 19 above entitled "High-Rise Tree Riser After Riser Reconfiguration or in New Construction" and described above may be used in the construction of new risers for high-rise buildings. The difference between this design and the design in the section above, is that the wiring run lengths do not exceed the rated distances for Cat-5 and similar communications wiring. Where wiring lengths do not exceed the rated transmission standards, fiber-optic cable may be replaced with Cat-5. Otherwise, the design is the same as described in the section above.

Thus, at least one of the embodiments described above provides the following:

1) Utilizes a single Ethernet network/wiring platform incorporating power transmission over the network to create a decentralized power distribution system to power Ethernet communication devices (telephone, digital television, high-speed Internet, video conferencing, video cameras, fire annuciators and building automation) and devices that are not used for communications (hard-wired smoke detectors, hard-wired heat detectors, exit signs and other life-safety alarms).

2) Utilizes Ethernet IADs and IFS as decentralized physical access points to connect Ethernet devices (telephone, digital television, high-speed Internet, video conferencing, video cameras, fire annuciators and building automation) for power and communications and devices not used for communication (hard-wired smoke detectors, hard-wired heat detectors, exit signs and other life-safety alarms) for power.

3) Combines together Circuit Breaker Boxes, Ethernet Power Meters and IADs in a physical space located in or proximate to residential units or office suites to reduce the size or entirely eliminate the need for electrical and communications closets.

Additionally, the following are regarded as novel in the embodiments discussed above:

1) Ethernet electrical meters are physically located within residential units, office suites or located proximate thereto.

2) Ethernet electrical meters are cross connected to a Circuit Breaker Box located within residential units, office suites or proximate in order to measure and monitor power usage and other relevant information.

3) Electrical meters incorporate a device or circuit to communicate via Ethernet or other communications standards over a communications network in order to report usage and other information in a unidirectional configuration or receive instructions in a bidirectional configuration.

4) Electrical meters are connected via copper wires, fiber-optics or wireless communications to IADs located in each unit or proximate thereto for the purpose of enabling unidirectional communications from the electrical meter to the IAD or bidirectional communication between the two devices.

5) IADs located within units or proximate thereto communicate with an IFS and or a LS.

6) The LS communicates to the HES via copper, electrical and or fiber-optic connections.

7) The HES provides communications access via physical control panels and or communications links to enable authorized third parties to receive information in unidirectional configurations or send instructions and receive information in a bidirectional configuration.

Although the embodiments above detail the use of the communications network with a MDU, which is a residential structure, the embodiments above may be applied to other types of structures as well. For example, the communications network may also be used in structures such as industrial, commercial, office, or retail structures.

Additionally, although the embodiments discussed above reference a high-rise building, the implementation of the communication system is not solely limited to a high-rise building and may be applied to any type of buildings such as mid-rise, low-rise, single family and warehouse structures.

Additionally, the powering of communications and non-communications devices through the Ethernet network is not dependent upon locating Ethernet power meters, circuit breaker boxes and IADs in units. The location of Ethernet power meters, circuit breaker boxes and IADs in units is not dependent upon powering communications and non-communications devices through the Ethernet network. The powering of communications and non-communications devices through the Ethernet network eliminates the need for discreet wiring for non-communication life-safety devices and reduces the distance those wires must run in order to draw power to operate. The location of Ethernet power meters, circuit breaker boxes and IADs in units permits the retrofit of existing wires and or the creation of new risers that are more space efficient than conventional electrical, telephone and cable TV risers.

While particular elements, embodiments, and applications of the present invention have been shown and described, it will be understood that the invention is not limited thereto since modifications may be made by those skilled in the art, particularly in light of the foregoing teachings. It is therefore contemplated by the appended claims to cover such modifications and incorporate those features which come within the spirit and scope of the invention.

What is claimed is:

1. A method for navigating a plurality of video channels, said method including:
   receiving a plurality of video channels at a video program guide generator, said video channels including a first video channel associated with a first video stream and a first audio stream and a second video channel associated with a second video stream and a second audio stream;
   generating a video program guide channel including:
   a first video channel window displaying video based on said first video stream, wherein said video displayed in said first video channel window is encoded before it is placed in said first video channel window in order to scale the display of said first video stream to fit in said first video channel window;
   a second video channel window displaying video based on said second video stream, wherein said video displayed in said second video channel window is encoded before it is placed in said second video channel window in order to scale the display of said second video stream to fit in said second video channel window;
   said first audio stream; and
   said second audio stream; and
   transmitting said video program guide channel to a client device for display to a user, wherein said transmitting takes place over a network,
   wherein said video program guide
      displays said first audio stream when said first video channel window is selected by a user, and
      displays said second audio stream when said second video channel window is selected by a user,
   wherein both said first video channel window and said second video channel window are displayed simultaneously without the use of multiple channel tuners,
   wherein an informative display appears in at least one of said first video channel window and said second video channel window in response to an update of a source of data, and including additional information from said source of data, about the event or events which are taking place, have taken place or are about to take place-within the program that is currently showing in the video in said window.

2. The method of claim 1 wherein said client device is a set top box.

3. The method of claim 1 wherein said client device is a computer.

4. A method for navigating video programs, said method including:
   receiving a plurality of video channels at a video program guide generator, said video channels including a first video channel associated with a first video stream and a first audio stream and a second video channel associated with a second video stream and a second audio stream;
   generating a first video program guide, wherein said first video program guide includes:
   a main video window displaying video information derived from said first video stream; and
   a plurality of secondary video windows, wherein at least one of said plurality of secondary video windows displays video information derived from said second video stream;
   generating a second video program guide channel, wherein said second video program guide channel includes:
   a main video window displaying video information derived from said second video stream; and
   a plurality of secondary video windows, wherein at least one of said plurality of secondary video windows displays video information derived from said first video stream; and transmitting at least one of said first video program guide channel and said second video program guide channel over a network to a client device, where a user may optionally select either said first video program guide channel or said second video program guide channel for display, wherein, when said first video program guide is displayed, both said main video window and said at least one of said plurality of secondary video windows are displayed simultaneously without the use of multiple channel tuners, wherein an informative display appears in at least one of said plurality of secondary video windows in response to an update of a source of data, and including additional information from said source of data, about the event or events which are taking place, have taken place or are about to take place-within the program that is currently showing in the video in said at least one of said plurality of secondary video windows.

5. The method of claim 4 wherein, when said main video window of said first video program guide is selected, said first audio stream is displayed.

6. The method of claim 4 wherein, when said main video window of said second video program guide is selected, said second audio stream is displayed.

7. The method of claim 4 wherein, when said main video window of said first video program guide is selected, metadata associated with said first video channel is displayed.

8. The method of claim 4 wherein, when said main video window of said second video program guide is selected, metadata associated with said second video channel is displayed.

9. The method of claim 4 wherein at least one of said video information derived from said first video stream and said video information derived from said second video stream represents a scaled version of its respective video channel.

10. The method of claim 4, wherein when said first video program guide channel is displayed and a secondary window displaying video information derived from said second video channel is selected, then said second video program guide channel is displayed.

11. The method of claim 4, wherein when said second video program guide channel is displayed and a secondary window displaying video information derived from said first video channel is selected, then said first video program guide channel is displayed.

12. The method of claim 4, wherein when said first video program guide channel is displayed and said main video window displaying video information derived from said first video channel is selected, then said first video channel is displayed.

13. The method of claim 4, wherein when said second video program guide channel is displayed and said main video window displaying video information derived from said second video channel is selected, then said second video channel is displayed.

14. The method of claim 7 wherein said metadata includes information with regard to statistical information relating to the content of said first video channel.

15. A method for generating a video programming guide channel, said method including:

receiving, at a video program guide generator, a first video channel including a first video stream and a first audio stream;

receiving, at said video program guide generator, a second video channel including a second video stream and a second audio stream;

generating, at said video program guide generator, a video program guide channel, wherein said video program guide channel includes:
a first video channel window displaying video representing a subset of said first video stream;
a second video channel window displaying video representing a subset of said second video stream;
said first audio stream; and
said second audio stream;

transmitting said video program guide to a client device for display to a user, wherein said transmitting takes place over a network, wherein said first audio stream is displayed when said first video channel window is selected by said user and said second audio stream is displayed when said second video channel window is selected by said user, wherein, when said video program guide is displayed, both said first video channel window and said second video channel window are displayed simultaneously without the use of multiple channel tuners; and wherein an informative display appears in at least one of said first video channel window and said second video channel window in response to an update of a source of data, and including additional information from said source of data, about the event or events which are taking place, have taken place or are about to take place-within the program that is currently showing in the video in said window.

* * * * *